(12) United States Patent
Iyer et al.

(10) Patent No.: US 12,399,924 B1
(45) Date of Patent: Aug. 26, 2025

(54) ROBUST METHODS FOR MULTI-DOMAIN SIGNAL EVALUATION SYSTEMS SYSTEMS

(71) Applicant: ExlService Holdings, Inc., New York, NY (US)

(72) Inventors: Gaurav Iyer, Delhi (IN); Arturo Devesa, New York, NY (US); Ashish Kudaisya, Delhi (IN); Solmaz Torabi, Austin, TX (US); Somya Rai, Faridabad (IN); Ankit Malviya, Ujjain (IN); Raunak Nitin Rathi, Pune (IN); Md Sharique, Bihar Sharif (IN); Manish Singh Mahra, Noida (IN)

(73) Assignee: ExlService Holdings, Inc., New York, NY (US)

( * ) Notice: Subject to any disclaimer, the term of this patent is extended or adjusted under 35 U.S.C. 154(b) by 0 days.

(21) Appl. No.: 19/072,917

(22) Filed: Mar. 6, 2025

(30) Foreign Application Priority Data

Sep. 11, 2024 (IN) .............................. 202411068819

(51) Int. Cl.
*G06F 16/338* (2019.01)
*G06F 3/0484* (2022.01)
*G06F 9/451* (2018.01)
*G06F 16/334* (2025.01)

(52) U.S. Cl.
CPC .......... *G06F 16/338* (2019.01); *G06F 3/0484* (2013.01); *G06F 9/453* (2018.02); *G06F 16/3344* (2019.01)

(58) Field of Classification Search
CPC .... G06F 16/338; G06F 9/453; G06F 16/3344; G06F 3/0484
See application file for complete search history.

(56) References Cited

U.S. PATENT DOCUMENTS

| | | | | |
|---|---|---|---|---|
| 12,033,408 | B1 * | 7/2024 | Malviya | G06V 30/1456 |
| 2007/0242891 | A1 * | 10/2007 | Fan | H04N 19/136 |
| | | | | 375/E7.193 |
| 2017/0116552 | A1 * | 4/2017 | Deodhar | G06Q 10/0639 |
| 2020/0357482 | A1 * | 11/2020 | Devesa | G16B 20/00 |
| 2023/0009304 | A1 * | 1/2023 | Jakobsson | G06Q 30/0241 |

(Continued)

*Primary Examiner* — Tadesse Hailu
(74) *Attorney, Agent, or Firm* — Perkins Coie LLP

(57) ABSTRACT

Systems and methods are disclosed comprising techniques for signal processing, such as receiving a first digital artifact comprising unstructured alphanumeric signal data indicating contextual information associated with a decision logic condition, identifying a set of non-compliant alphanumeric signals from the unstructured alphanumeric signal data, generating a set of masking elements comprising a mapping to the set of non-compliant alphanumeric signals, generating a second digital artifact comprising alphanumeric signal data that substitutes the identified non-compliant alphanumeric signals with the set of masking elements, determining a set of signal domain categories for the second digital artifact corresponding to alphanumeric signal properties satisfied by the alphanumeric signal data of the second digital artifact, generating a composite alphanumeric signal for the second digital artifact based on the determined set of signal domain categories, and generating for display at a user interface a set of guidance artifacts generated using the composite alphanumeric signal.

20 Claims, 7 Drawing Sheets

(56) References Cited

U.S. PATENT DOCUMENTS

| | | | | |
|---|---|---|---|---|
| 2023/0153641 | A1* | 5/2023 | Manda | G06F 40/295 |
| | | | | 707/603 |
| 2024/0362937 | A1* | 10/2024 | Malviya | G06V 30/16 |
| 2024/0423535 | A1* | 12/2024 | Bradley | G16H 50/30 |

* cited by examiner

ROBUST METHODS FOR MULTI-DOMAIN SIGNAL EVALUATION SYSTEMS SYSTEMS

CROSS-REFERENCE TO RELATED APPLICATIONS

This application claims the benefit of priority to India patent application No. 202411068819, filed on Sep. 11, 2024, entitled SYSTEM AND METHOD FOR MULTI-DOMAIN INFORMATION PROCESSING USING LARGE LANGUAGE MODELS, which is hereby incorporated by reference in its entirety.

TECHNICAL FIELD

The present disclosure generally relates to systems and methods for natural language processing (NLP). More particularly, the present disclosure relates to a system and a method for multi-domain information processing using large language models (LLMs).

BACKGROUND

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admission of the prior art.

Machine learning (ML) is a field of study in artificial intelligence concerned with the development and study of statistical algorithms that can learn from data and generalize to unseen data, and thus perform tasks without explicit instructions. Within a subdiscipline in machine learning, advances in the field of deep learning have allowed neural networks, a class of statistical algorithms, to surpass many previous machine learning approaches in performance.

Natural language processing is a subfield of computer science and especially artificial intelligence. It is primarily concerned with providing computers with the ability to process data encoded in natural language and is thus closely related to information retrieval, knowledge representation and computational linguistics, a subfield of linguistics. Typically data is collected in text corpora, using either rule-based, statistical or neural-based approaches in machine learning and deep learning.

A large language model is a type of machine learning model designed for natural language processing tasks such as language generation. LLMs are language models with many parameters and are trained with self-supervised learning on a vast amount of text. The largest and most capable LLMs are generative pretrained transformers (GPTs). Modern models can be fine-tuned for specific tasks or guided by prompt engineering. These models acquire predictive power regarding syntax, semantics, and ontologies inherent in human language corpora, but they also inherit inaccuracies and biases present in the data they are trained in.

BRIEF DESCRIPTION OF THE DRAWINGS

Detailed descriptions of implementations of the present invention will be described and explained through the use of the accompanying drawings.

Figure 1:
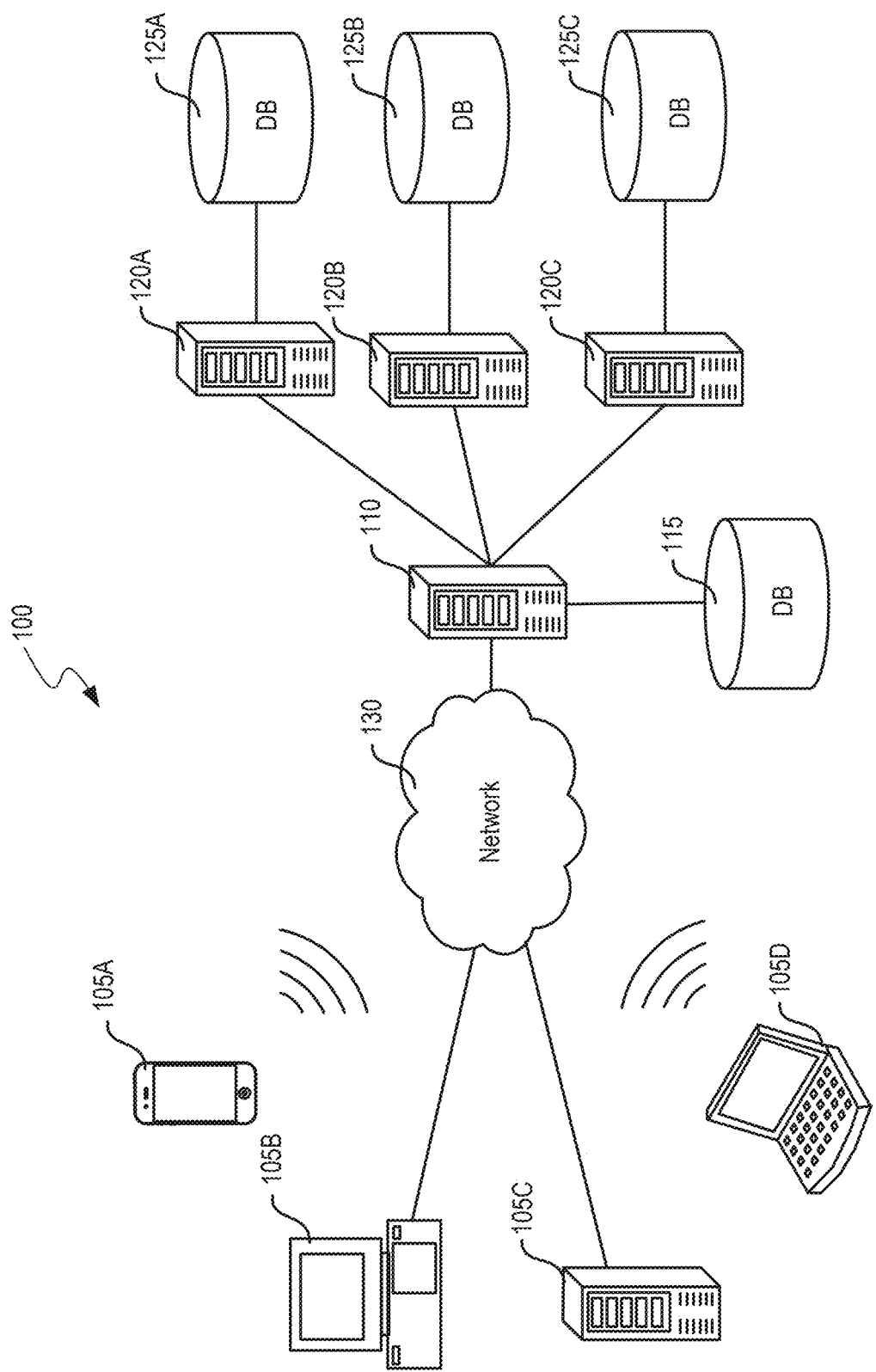
FIG. 1 is a system diagram illustrating an example of a computing environment in which the disclosed system operates in some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Complex decision based logical conditions (e.g., enterprise-level project management, cost-benefit analysis of insurance claims, and/or the like) often require detailed analysis of disparate data sources corresponding to multiple different and/or specialized signal domains (e.g., a medical knowledge base, a legal knowledge base, and/or the like). Proper evaluation of such decision logic conditions requires synergetic analysis and consideration of intercorrelated features and/or signals present within these disparate data sources (e.g., a medical report supporting a legal standing, a legal framework guiding monetary policies, and/or the like). Further, the actual contents of these data sources typically include protected and/or sensitive information (e.g., demographics for individual persons, HIPAA privileged information, and/or the like) that cannot be accessed and/or readily used for evaluation processes. Accordingly, conventional systems typically use censored versions of these data sources (e.g., a text-based document with redacted paragraphs) that only include insensitive and/or low-risk information when evaluating decision logic conditions. However, these censored components often include critical contextual information (e.g., an individual hospitalization record) necessary for an adequate analysis of the decision logic condition (e.g., expected health related risks) with respect to individual and/or interrelated signal domains (e.g., a medical knowledge base). Due to the limited contextual information, these existing systems are limited in their ability to generate detailed and/or precise analytics when evaluating complex decision logic conditions (e.g., an insurance claim scenario) involving multiple knowledge and/or signal domains.

To address these and other similar issues of conventional systems, the current invention introduces systems, methods, and computer-readable media for multi-domain signal evaluation that leverages and extends the capabilities of statistical inferencing models, including but not limited to machine learning (ML) models, generative machine learning (GenAI) models, and/or the like. For example, the system can receive input data (e.g., alphanumeric signal data) from disparate data sources (e.g., a medical record, a legal ruleset, and/or the like) that may include inaccessible or protected information. Prior to anonymization (e.g., censorship and/or redaction) of the input data contents, the disclosed system can identify and assign relevant signal domain categories (e.g., labeled tags corresponding to predetermined signal attributes and/or properties) that enables the input data to retain contextual metadata. As a result, the system can process and categorize diverse types of structured and unstructured data across multiple domains in a compact and regulatory compliant manner. In some implementations, the system can employ a machine learning model (e.g., a statistical inference algorithm, a large language model, and/or the like) to perform one or more operations described herein, including but not limited to substituting non-compliant input data (e.g., privileged information) and/or identifying subsets of alphanumeric signals that satisfy the properties of different signal domain categories.

The system can employ various de-identification techniques to help ensure compliance with privacy regulations. For example, the data de-identification engine can remove or mask direct identifiers such as names, addresses, and social security numbers from the input data. Indirect identifiers that could potentially be used to re-identify individuals can also be transformed or removed. The system can utilize pseudonymization to replace identifying information with artificial identifiers. Advanced anonymization techniques can be applied to provide mathematical and technical safeguards against re-identification of individuals. These de-identification methods can allow the system to process sensitive information like medical records while maintaining compliance with regulations such as HIPAA. The specific techniques used can be customized based on the particular privacy requirements and use cases involved.

Additional aspects of the invention include its ability to generate human-readable narratives and recommendations based on the processed data. The system can provide real-time responses to user queries and offer insights across multiple domains simultaneously. Furthermore, the invention's architecture allows for integration with existing infrastructure and can be adapted to meet specific industry requirements and address specific use cases.

For illustrative purposes, examples are described herein in the context of computing systems for processing alphanumeric signal data. However, a person skilled in the art will appreciate that the disclosed system can be applied in other contexts and input data can include tabular data, numeric data, image data, video data, audio data, and/or multimodal data. Further, the disclosed system can be used in computing infrastructures for fraud detection, risk assessment, and evaluating regulatory compliance.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Computing Environment

FIG. 1 is a system diagram illustrating an example of a computing environment in which the disclosed system operates in some implementations. In some implementations, environment 100 includes one or more client computing devices 105A-D (e.g., user equipment (UE) devices), examples of which can host the multi-domain signal evaluation system 200 of FIG. 2. Client computing devices 105 operate in a networked environment using logical connections through network 130 to one or more remote computers, such as a server computing device. In some implementations, the one or more client computing devices 105A-D can include, but not limited to, a mobile device, a laptop, a personal computer, a server, a virtual reality (VR) device, an augmented reality (AR) device, a personal digital assistant, a tablet computer, and/or the like. In additional or alternative implementations, the one or more client computing devices 105A-D can include one or more in-build or externally coupled accessories including, but not limited to, a visual aid device such as a camera, audio aid, microphone, or keyboard. In some implementations, one or more functions of the multi-domain signal evaluation system 200 can use input data (e.g., user interactive actions) received from input features (e.g., touchpad, touch-enabled screen, electronic pen, and/or the like) of the client computing devices 105A-D.

In some implementations, server 110 is an edge server which receives client requests and coordinates fulfillment of those requests through other servers, such as servers 120A-C. The client requests received by the servers 120A-C can be related to processing of data related or associated with one or more users and/or computing devices 105A-D. In some implementations, server computing devices 110 and 120 comprise computing systems, such as the multi-domain signal evaluation system 200 of FIG. 2. Though each server computing device 110 and 120 is displayed logically as a single server, server computing devices can each be a distributed computing environment encompassing multiple computing devices located at the same or at geographically disparate physical locations. In some implementations, each server 120 corresponds to a group of servers.

Client computing devices 105 and server computing devices 110 and 120 can each act as a server or client to other server or client devices. In some implementations, servers (110, 120A-C) connect to a corresponding database (115, 125A-C). As discussed above, each server 120 can correspond to a group of servers, and each of these servers can share a database or can have its own database. Databases 115 and 125 warehouse (e.g., store) information such as claims data, email data, call transcripts, call logs, policy data and so on. In some implementations, the databases 115 and 125 can store machine learning models (e.g., a large language model) used by the multi-domain signal evaluation system 200 of FIG. 2. Though databases 115 and 125 are displayed logically as single units, databases 115 and 125 can each be a distributed computing environment encompassing multiple computing devices, can be located within their corresponding server, or can be located at the same or at geographically disparate physical locations.

In some implementations, the databases 115 and 125 can store data received from the one or more client computing devices 105A-D (e.g., via the computing servers 110 and/or 120A-C). The received data can include, but is not limited to, structured data, unstructured data, and/or synthetic data (e.g., testing data). Structured data can include well-organized information that fits into predefined fields and/or tables that can easily be searched or analyzed. For example, structured data can include details of insurance claims, such as a policy number, approximate claim amount, date of incident, relevant coverage criteria, claim status, and/or the like. In another example, structured data can include customer profile information with data fields, such as a legal name, an address, a policy type, a premium amount, a subscription status, and/or the like. Accordingly, the databases 115 and 125 can store structured data that allows for simple query and reporting.

In some implementations, the databases 115 and 1 25 can store unstructured data that include information that does not fit into tables or predefined formats, often requiring more sophisticated techniques for proper interpretation. For example, unstructured data can include unprocessed alphanumeric signal information (e.g., string text) corresponding to customer feedback from customer reviews, complaints, or service interactions. In another example, unstructured data can include detailed narratives or free-form text provided by policyholders describing incidents or damages.

In some implementations, the databases 115 and 1 25 can store synthetic data (e.g., testing data, masking data, fabricted data, and/or the like) designed according to a subject matter expert (SME) to simulate real-world client data. The synthetic data can be pre-processed prior to the evaluation by the multi-domain signal evaluation system 200 (e.g., via a machine learning model). In some implementations, the multi-signal evaluation system 200 can further process the synthetic data to generate information associated with one or more predefined signal domains (e.g., business-specific categories and/or policies).

In some implementations, the databases 115 and 125 can be configured to store a plurality of machine learning models (e.g., natural language processing (NPL) algorithms, large language models (LLMs), and/or the like) for processing alphanumeric signal information. For example, the databases 115 and 125 can store a generic pre-trained model (e.g., provided by a third-party vendor) that can process input alphanumeric signal data to generate initial baseline results. In another example, the databases 115 and 125 can store a fine-tuned model (e.g., using custom training data) that can process input alphanumeric signal data to generate informed and/or enhanced results. Accordingly, the multi-domain signal evaluation system 200 can compare evaluation results (e.g., for the synthetic data) generated from a first model (e.g., generic pre-trained) and a second model (e.g., custom fine-tuned) to determine robust system performance metrics and identify additional areas for improvement.

In some implementations, the servers 110 and/or 120 can include programmable memory modules and/or engines configured to perform, or execute, one or more data preprocessing instructions prior to evaluating signal data (e.g., alphanumeric signals) using a machine learning model (e.g., a large language model). For example, the servers 110 and/or 120 can receive alphanumeric signal data from a client device 105 associated with an enterprise entity (e.g., an insurance company). The received signal data can be received in a Portable Document Format (PDF), including both machine-readable and scanned document formats. The system can preprocess received signal data (e.g., PDF documents) using text detection tools (e.g., Optical Character Recognition) to extract text in an efficient manner. In some implementations, the system can use a machine learning model (e.g., a large language model, a convolutional neural network, and/or the like) to preprocess the received signal data. In some implementations, the system can be configured to preprocess the received signal data to preserve representation of existing data structures (e.g., a table, a list, and/or the like) from the digital document. The system can store the received signal data and/or preprocessed data in structured and/or unstructured data formats (e.g., Structured Query Language (SQL)) at one or more databases 115 and/or 125.

In some implementations, the servers 110 and/or 120 can receive (e.g., via the programmable memory modules) alphanumeric signal data (e.g., linguistic text) from digital document sources that correspond to a decision logic condition including, but not limited to, standard operating procedures (SOPs), policies, manuals, contracts, utilization management, care management, claims processing, claims re-processing, clinical claim audits and reviews, grievance and appeals disputes, and benefits and products.

In some implementations, the servers 110 and/or 120 can evaluate (e.g., via the programmable memory modules) the received alphanumeric signal data to generate diagnostic information associated with one or more signal domain groups. For example, the servers 110 and/or 120 can cause a machine learning model (e.g., a large language model) to generate a composite alphanumeric signal (e.g., a summarized text narrative) based on input alphanumeric signal data (e.g., character strings) extracted from a digital artifact (e.g., a text-based document).

In some implementations, the servers 110 and/or 120 can further augment and/or annotate one or more portions of the extracted alphanumeric signal data with one or more signal domain categories (e.g., data type labels) each representing a predefined set of signal properties (e.g., keywords, content type, and/or the like). As an example, the servers 110 and/or 120 can assign portions of the extracted text data of the input digital document one or more classification labels corresponding to different business process use cases (e.g., financial expense, risk assessment, claim eligibility, medical record summarizations, contract renewals, utilization management, care management, care management, medical adherence, compiled claim history from assorted notes, transcripts, documents, prediction, data-driven underwriting recommendations, and/or the like).

In some implementations, the servers 110 and/or 120 can evaluate (e.g. via the programmable memory modules) the extracted alphanumeric signal data (e.g., of the source digital document) based on the assigned signal domain categories (e.g., data type labels). For example, the servers 110 and/or 120 can cause a machine learning model (e.g., a large language model) to generate a summarized text narrative for contents of the digital document based on one or more subsets of the extracted alphanumeric signal data (e.g., text substrings) that correspond to the assigned signal domain categories. In some implementations, the servers 110 and/or 120 can use the evaluation results (e.g., the generated text narrative) to create one or more guidance artifacts for the decision logic condition. A guidance artifact can include, but is not limited to, a user interactive element (e.g., an interface screen, widget, and/or the like) that is configured to display informational contents (e.g., text data) corresponding to the extracted alphanumeric signal data, the assigned signal domain groups, and/or the generated summarized text narrative. In some implementations, the server 110 and/or 120 can configure the guidance artifact to include one or more recommended available user actions associated with the decision logic condition (e.g., claim approval, legal actions, and/or the like) based on summarized narrative.

In some implementations, the servers 110 and/or 120 can transmit and/or display the generated guidance artifacts at user interfaces of one or more SMEs (e.g., medical professionals, legal authorities, and/or the like) associated with the decision logic condition (e.g., insurance claim scenario). Examples of SMEs can include, but is not limited to, claim adjusters, nurses, underwriters, case managers, assistants, recovery specialists, auditors, adjudicators, actuaries, clinical teams, contract negotiators, health plan sales team, and/or the like.

In some implementations, the servers 110 and/or 120 can be configured to perform one or more additional evaluation processes in response to detected user interactions with the one or more displayed guidance artifacts. For example, the servers 110 and/or 120 can display an interactive user interface element that enables users (e.g., SMEs, authorized users, and/or the like) to submit feedback information for the summarized text narrative. Accordingly, the servers 110 and/or 120 can perform an iterative improvement logic that re-evaluates the summarized text narrative for the extracted alphanumeric signal data based on the signal domain categories and the user submitted feedback data. For example, the servers 110 and/or 120 can cause the machine learning model (e.g., a large language model) to generate a second version of the summarized narrative based on an input comprising the first version of the summarized narrative, the extracted alphanumeric signal data, the assigned signal domain categories, and/or the received user feedback data. In some implementations, the servers 110 and/or 120 can be configured to iteratively adjust (e.g., retrain, finetune, and/or the like) the machine learning model to provide improved content accuracy and validity for the summarized text narrative with respect to the one or more signal domain categories.

In some implementations, the servers 110 and/or 120 can be configured to generate custom and/or personalized guidance artifacts using anonymized data sources. The servers 110 and/or 120 can identify one or more non-compliant signals from the extracted alphanumeric signal data (e.g., of the source digital component) that fail to satisfy one or more required data compliance parameters (e.g., data privacy rules). Accordingly, the servers 110 and/or 120 can replace, or substitute, the identified signals to instead use pre-defined masking elements and/or signals (e.g., a generic text, a symbolic link, and/or the like) that comply with the one or more required data compliance parameters. Accordingly, the servers 110 and/or 120 can still use contextual information of the anonymized signals and/or data sources to generate a custom guidance artifact for the source digital document. As a result, the servers 110 and/or 120 can facilitate compliance and security through data protection regulation, ensuring data remains at the source, reducing the risk of breaches during data transfers. In an illustrative example, the servers 110 and/or 120 can provide personalized insurance reports and/or recommendations of more personalized insurance products by leveraging anonymized data from multiple sources to better tailored policies based on comprehensive insights.

In some implementations, the servers 110 and/or 120 can provide collaboration and benchmarking where insurers can collaborate on shared challenges like predicting medical costs or assessing policyholder behavior without exposing proprietary data, leading to better industry-wide benchmarks and practices.

In some implementations, the servers 110 and/or 120 can implement scalability across multiple institutions, as the model can continually improve and adapt based on an expanding dataset, providing increasingly accurate and robust results. For example, the servers 110 and/or 120 can monitor and/or record user feedback data with respect to the generated guidance artifacts. Accordingly, the servers 110 and/or 120 can update (e.g., re-train, finetune, and/or the like) one or more machine learning models used to extract the alphanumeric signal data, summarize the alphanumeric signal data, substitute the alphanumeric signal data, and/or generate the displayed guidance artifacts. In some implementations, the servers 110 and/or 120 can use an ensemble of models (e.g., an interconnected plurality of machine learning models) to perform one or more of the processes described herein. Each model in the ensemble can be trained on a specialized subset of data corresponding to a specific data domain. For example, the servers 110 and/or 120 can use multiple expert models, each trained on different aspects of medical insurance, such as claims processing, fraud detection, risk assessment, and customer support. By selectively restricting the domain knowledge used to train an individual model, the servers 110 and/or 120 can improve the evaluation accuracy and/or efficiency of each individual model, resulting in overall improved performance of the ensemble.

In some implementations, the servers 110 and/or 120 can use a gating network to dynamically select the most relevant expert(s) (SMEs) for a given task or input. For example, when assessing a business claim, the gating network can select an expert specializing in fraud detection or one focusing on policy compliance based on the claim's characteristics. The servers 110 and/or 120 can provide improved accuracy by leveraging domain-specific experts. Further, the servers 110 and/or 120 cam use input of domain-specific experts to improve the model's overall performance, providing more accurate predictions and insights tailored to the medical insurance field.

In some implementations, the servers 110 and/or 120 can allow for scalable solutions where new experts can be added or existing ones can be updated independently, adapting to new challenges or changes in the insurance domain. Further, the servers 110 and/or 120 can improve computational efficiency by activating only the relevant experts for each task, reducing the overall computational burden compared to using a single, monolithic model. The servers 110 and/or 120 can also tailor insurance products and services to individual needs by employing experts that specialize in various aspects of customer profiles, medical histories, and policy preferences.

Network 130 can be a local area network (LAN) or a wide area network (WAN), but can also be other wired or wireless networks. In some implementations, network 130 is the Internet or some other public or private network. Client computing devices 105 are connected to network 130 through a network interface, such as by wired or wireless communication. While the connections between server 110 and servers 120 are shown as separate connections, these connections can be any kind of local, wide area, wired, or wireless network, including network 130 or a separate public or private network.

Multi-Domain Signal Evaluation System

Figure 2:
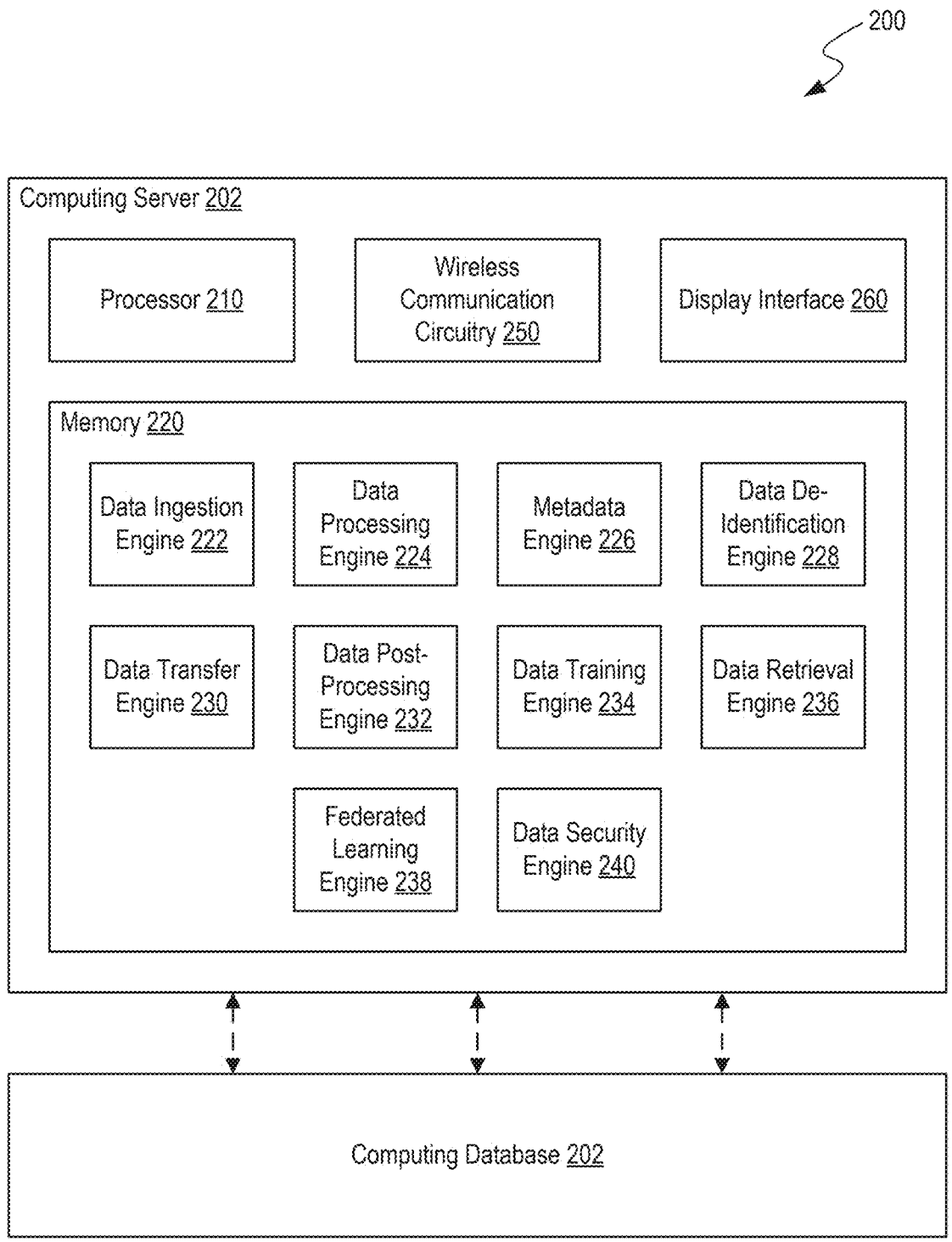
FIG. 2 is a block diagram that illustrates a multi-domain signal evaluation system that can implement aspects of the present technology.

FIG. 2 a block diagram that illustrates a multi-domain signal evaluation system 200 (alternatively referred to as "signal evaluation system 200" or "system 200") that can implement aspects of the present technology. The components shown in FIG. 2 are merely illustrative, and well-known components are omitted for brevity. As shown, the computing server 202 includes a processor 210, a memory 220, a wireless communication circuitry 250 to establish wireless communication channels (e.g., telecommunications, internet) with other computing devices and/or services (e.g., servers, databases, cloud infrastructure), and a display interface 260. The processor 210 can have generic characteristics similar to general-purpose processors, or the processor 210 can be an application-specific integrated circuit (ASIC) that provides arithmetic and control functions to the computing server 202. While not shown, the processor 210 can include a dedicated cache memory. The processor 210 can be coupled to all components of the computing server 202, either directly or indirectly, for data communication. Further, the processor 210 of the computing server 202 can be communicatively coupled to a computing database 204 that is hosted alongside the computing server 202 on the core network 130 described in reference to FIG. 1.

The memory 220 can comprise any suitable type of storage device including, for example, a static random-access memory (SRAM), dynamic random-access memory (DRAM), electrically erasable programmable read-only memory (EEPROM), flash memory, latches, and/or registers. In addition to storing instructions that can be executed by the processor 210, the memory 220 can also store data generated by the processor 210 (e.g., when executing the modules of an optimization platform). In additional or alternative implementations, the processor 210 can store temporary information onto the memory 220 and store long-term data onto the computing database 204. The memory 220 is merely an abstract representation of a storage environment. Hence, in some implementations, the memory 220 comprises one or more actual memory chips or modules.

As shown in FIG. 2, modules of the memory 220 can include a data ingestion engine 222, a data processing engine 224, a metadata engine 226, a data de-identification engine 228 (alternatively referred to as "data anonymization engine 228"), a data transfer engine 230, a data post-processing engine 232, a data training engine 234, a data retrieval engine 236, a federated learning engine 238, and/or a data security engine 240. Other implementations of the computing server 202 include additional, fewer, or different modules, or distribute functionality differently between the modules. As used herein, the term "module" refers broadly to software components, firmware components, and/or hardware components. Accordingly, the modules 222-240 could each comprise software, firmware, and/or hardware components implemented in, or accessible to, the computing server 202.

The data ingestion engine 222 can be configured to receive input signal data (e.g., alphanumeric signal data) from one or more computing device 105 communicatively coupled to the computing server 202 (e.g., via the wireless communication circuitry 250). For example, the data ingestion engine 222 can intake a digital artifact (e.g., a digital document, a PDF, and/or the like) that includes one or more alphanumeric signal information associated with a decision logic condition (e.g., an insurance claim scenario). In some implementations, the data ingestion engine 222 can store retrieved input signal data onto the computing database 204.

In some implementations, the data processing engine 224 can be configured to transform and/or modify the initial input signal data prior to further signal domain evaluations. For example, the system 200 can extract and reformat the alphanumeric signal data (e.g., text-based strings) from the input digital artifact into a structured, unstructured, and/or synthetic data structure. In some implementations, the data processing engine 224 can extract signal information (e.g., alphanumeric signal data) directly from metadata associated with the input digital artifact (e.g., a cache memory corresponding to fillable elements of a digital form). In some implementations, the data processing engine 224 can use signal transcription tools to transform raw signal information stored in the input digital artifact to extract alphanumeric signals (e.g., text-based strings). For example, the data processing engine 224 can use Optical Character Recognition (OCR) to convert text from scanned documents (e.g., rasterized images) and PDFs into machine-readable formats.

In some implementations, the metadata engine 226 can use proprietary applications to efficiently fetch alphanumeric signals (e.g., text data) from the input digital artifacts (e.g., document objects) while retaining proper metadata and contextual information associated with the original artifact (e.g., positional coordinates at a line and word level for maintaining the proper context). In some implementations, the metadata engine 226] can perform a data cleaning process to remove irrelevant information, correct errors, and standardize the data formats to ensure consistency and accuracy. In some implementations, the system 200 can implement data structuring to separate out text and table content, convert table content into textual structure, and combine both text and converted table content into a single data, ensuring consistency and accuracy.

In some implementations, the data anonymization engine 228 can implement a data anonymization process to censor sensitive alphanumeric signals in the input signal data from view of further downstream processes (e.g., input for machine learning models). For example, the data anonymization engine 228 can mask sensitive information, such as personal and/or identifiable details about an individual that can lead to risk of data privacy and security. In some implementations, the data anonymization engine 228 can anonymize the input signal data using one or more compliance parameters, such as a Personally Identifiable Information (PII) and Protected Health Information (PHI) identification process. For example, the data anonymization engine 228 uses an advanced mechanism to identify the sensitive information including, but not limited to, a name, an address, a date of birth, an individual social security number, a medical record number, and/or the like. In another example, the data anonymization engine 228 can use referral and identification of Health Insurance Portability and Accountability Act (HIPAA) safe harbor list of entities using a tool specifically designed for healthcare and life sciences applications. Accordingly, the data anonymization engine 228 can identify non-compliant signals and/or terms along with a corresponding text coordinate in a document.

In some implementations, the data anonymization engine 228 can implement the data anonymization process using a PII/PHI anonymization process. The PII/PHI anonymization process can receive a list of identified entities extracted from the PII/PHI identification process and uses a Secure Hash Algorithm (SHA)-256 security protocol to convert each of the entities into their corresponding n-digit hash value, where n can be 16 or less bits. In some implementations, these hash values can be consistent for similar entities which help in reproducing the same n-digit value for the same entity across different sections of the document. Accordingly, the data anonymization engine 228 can preserve the context along with anonymization of PII/PHI information. In additional or alternative implementations, the data anonymization engine 228 can use other similar security protocols for one or more processes described within the scope of the present disclosure.

In some implementations, the data anonymization engine 228 can further implement the data anonymization process using a PII/PHI validation process. The PII/PHI validation process can require a human validator/SME to validate each of the identified and anonymized entities to prevent any leakage in the PII/PHI information. The PII/PHI validation process can act as a feedback mechanism to further enhance the identification and anonymization process.

In some implementations, the data anonymization engine 228 can further implement the data anonymization process using a post-processing process. For example, the post-processing process can be a final step in which all the leaked PII/PHI information is further anonymized using the defined set of rules and regex pattern to ensure maximum accuracy in the anonymization process. Accordingly, the post-processing process can ensure that the training data provided to downstream processes and/or modules (e.g., a large language model) cannot be traced back to the patient/user, or any additional sensitive information from the original input digital artifact.

In some implementations, the data transfer engine 230 can implement a data transferring process to securely move data from the client environment to the training environment. At the data transfer stage, the data transfer engine 230 can use the computing database 204 to securely move data from the client environment to the training environment. Accordingly, the data transfer engine 230 can ensure seamless data copying across regions, providing backup and reliability. In some implementations, the data transfer engine 230 can use encryption techniques to protect data and provide data confidentiality and/or integrity throughout the transfer process.

In some implementations, the data post-processing engine 232 can implement an Extract, Transform, Load (ETL) process/data post-processing process to handle masked data, which is initially provided in a particular format (e.g., JavaScript Object Notation (JSON) format). In some implementations, the data post-processing engine 232 can integrate the necessary datasets to form combined data. In some implementations, the data post-processing engine 232 can extract essential information as input-output pairs where transformed data can be split into a training phase, a testing phase, a validation phase, and a final testing set phase. Accordingly, the data post-processing engine 232 can ensure that all required information is included for SME validation and help generate synthetic data for comparison with competitive LLMs. In some implementations, the data post-processing engine 232 can ensure that the data is clean, well-structured, and ready to ingest for model training. In some implementations, the data post-processing engine 232 can apply the necessary transformations, data-cleaning, and pre-processing to ensure data integrity, quality, and structure. In some implementations, the data post-processing engine 232 can convert the data to a suitable JSON Lines (JSONL) format, and further make the data available for model processing.

In some implementations, the data training engine 234 can implement a model training process where the LLM model is trained with a format context with page text including information related to various questions. In some implementations, the data training engine 234 can be trained to generate and/or predict outputs that are presented in a short and crisp format to the SME for validation. In some implementations, the data training engine 234 can also combine answers from different timelines (e.g., dates) from the same page text into a single answer while removing anomalies from the dataset. In some implementations, the data training engine 234 can target a subset of parameters (e.g., 1-5% of total parameters) for fine-tuning the model. To enable supervised fine-tuning (SFT), the data training engine 234 can implement a PEFT. In some implementations, the data training engine 234 can use an adapter dimension at a higher end due to the large volume of data available for training the model. For example, the data training engine 234 can implement Low-Rank Adaptation (LoRa) weights, where the weights are merged with the original weights of the training model for inferencing. For fine-tuning, the data training engine 234 can leverage the computation resources from cloud compute engine, where the model can be trained with one node (e.g., efficient graphic processing units (GPUs)). To maximize the use of computation, the data training engine 234 can implement tensor parallelism that can enable the model to perform computation at the tensor level. In some implementations, the data training engine 234 can use one or more GPUs, where pipeline and sequence parallelism can be implemented to maximize the use of GPUs.

In some implementations, the data training engine 234 can post train the LLM model using an inferencing process that includes inference tasks with an inference pipeline providing rapid and scalable AI solutions for applications and addressing many key requirements. In some implementations, the data training engine 234 can be configured to efficiently manage multiple types of queries, such as real-time and batch processing. In some implementations, the data training engine 234 can enable concurrent execution of multiple types of queries through the inference pipeline. Accordingly, the data training engine 234 can improve performance and reduce latency by running the model on multiple GPUs simultaneously. In some implementations, the data training engine 234 can include adaptive batching where inference optimization can be achieved by adjusting batch sizes to maximize throughput while minimizing latency. Accordingly, the data training engine 234 can balance various factors to enhance performance and include grouping of simultaneous query requests from multiple users into a single GPU batch query. In some implementations, the data training engine 234 can inference across multiple GPUs and nodes. To enable the inferencing across multiple GPUs and nodes, the data training engine 234 can implement multi-GPU, multi-node inferences through model parallelism techniques. Accordingly, the data training engine 234 can effectively distribute a large model across several GPUs and multiple nodes, ensuring efficient distribution, and processing. In some implementations, the data training engine 234 can also provide comprehensive support to multiple applications and various AI platforms. In some implementations, the data training engine 234 can provide a docker container that effortlessly integrates with numerous Kubernetes platforms, ensuring smooth compatibility and operation.

In some implementations, the data training engine 234 can enhance wide range of business outcomes. For example, the data training engine 234 can automate part of the claims adjudication process, claim negotiation guidance, and payment integrity. In some implementations, the data training engine 234 can also increase the quality of adjudication, lower the cost through less manual labour, and lower the time associated with processing of a business claim. In some implementations, the data training engine 234 can specifically automate part of the policy underwriting, risk assessment, and medical record summarization, while increasing the quality of underwriting. Accordingly, the data training engine 234 can lower the cost and reduce the time required for risk assessment.

In some implementations, the data training engine 234 can provide powering negotiation guidance through data-driven recommendations for enhancing negotiation strategies in medical claims. For example, the data training engine 234 can provide powering medical record tagging and summarization through automation of the tagging and summarization of medical records providing quicker and more accurate information retrieval. In some implementations the data training engine 234 can also act as a claim adjuster agent with contextual claim insights and including a responding capability. Accordingly, the data training engine 234 can deliver contextual insights and answers to improve the efficiency and accuracy of claims processing. In some implementations, the data training engine 234 can also provide claim leakage prevention, where the data training engine 234 can detect and flag potential claim anomalies to prevent financial losses due to leakage.

In some implementations, the data training engine 234 can include the scalable, modular, and secure architecture, which is highly scalable, supporting seamless expansion to accommodate multiple clients simultaneously. In some implementations, the data training engine 234 can include a modular design that enables easy integration with various cloud providers ensuring flexibility and adaptability. Accordingly, the data training engine 234 can allow for customized deployment according to specific client needs. In some implementations, the data training engine 234 can include robust security measures to safeguard client data, maintaining integrity and confidentiality. Accordingly, the data training engine 234 can ensure a reliable and adaptable solution for diverse client requirements.

In some implementations, the data training engine 234 can access private, domain specific client data to provide specific insights using the exclusive, domain-specific client data. In some implementations, the data training engine 234 can provide recommendations that are highly relevant and customized. In some implementations, the data training engine 234 can enable SME and AI integration. For example, the data training engine 234 can provide specialized SMEs with advanced AI to leverage both expert knowledge and cutting-edge technology.

In some implementations the data retrieval engine 236 can use a customized Retrieval-Augmented Generation (RAG) pipeline for addressing specific client needs, providing more accurate and contextually relevant results than generic solutions with an addition of noise in the context during the fine tuning. In some implementations, the data retrieval engine 236 can include a secure RAG pipeline with data privacy to generate relevant information associated with the one or more domains. Accordingly, the data retrieval engine 236 can ensure that sensitive information is protected during both retrieval and generation processes. In some implementations, the data retrieval engine 236 the system 200 can implement data anonymization and encryption methods to safeguard privacy. In some implementations the data retrieval engine 236 can provide access control with restricted access to authorized users only. In some implementations, the data retrieval engine 236 can implement robust authentication and authorization mechanisms. In some implementations, the data retrieval engine 236 can provide data encryption where data can be encrypted at both at rest and in transit to prevent unauthorized access of data and ensure data integrity. In some implementations, the data retrieval engine 236 can maintain logs of access and changes to monitor and respond to potential security incidents.

In some implementations, the federated learning engine 238 can identify the complex patterns across the various business process use cases. In some implementations, the federated learning engine 238 can utilize federated learning (FL) which addresses privacy and ownership concerns in multi-institutional collaborations. Accordingly, the federated learning engine 238 can train models locally at each institution (e.g., signal domain category) and then aggregating the results, thus avoiding the need to share sensitive data. As a result, the federated learning engine 238 can provide significant benefits while addressing privacy and data sharing concerns through the FL.

In some implementations, the system 200 can provide multiple expert models, each trained on different aspects of domains that focus on a specific area, improving accuracy and efficiency. In some implementations, the system 200 can provide a gating network that dynamically selects the most relevant expert(s) for a given task or input. In some implementations, the system 200 can leverage domain-specific experts, enhancing the model's overall performance, providing more accurate predictions, and insights tailored to the specific insurance field. In some implementations, the system 200 can facilitate scalable solutions where new experts can be added or existing ones can be updated independently, adapting to new challenges or changes in the insurance domain. In some implementations, the system 200 can improve computational efficiency by activating only the relevant experts for each task, reducing the overall computational burden compared to using a single, monolithic model. In some implementations, the system 200 can provide tailored products (e.g., guidance artifacts) and services to individual needs by employing experts that specialize in various aspects of domains.

In some implementations, the data security engine 240 can provide data privacy and/or security for enabling institutions to collaboratively train the LLM models on their local data without sharing the actual data, which ensures compliance with privacy regulations like HIPAA or GDPR. In some implementations, the data security engine 240 can provide improved risk assessment by aggregating insights from various institutions. In some implementations, the data security engine 240 can use federated learning to enhance risk assessment models, leading to better predictions for policyholder's health risks, and insurance claims.

In some implementations, the data security engine 240 can provide fraud detection by combining patterns from different insurers. For example, the data security engine 240 can enable each institution to train a local LLM model on specific data. Accordingly, the data security engine 240 can aggregate insights from the locally trained models to help in identifying fraudulent claims more effectively. Accordingly, the data security engine 240 can optimize business claim processing by aggregating knowledge across institutions. In some implementations, the data security engine 240 can enable training of local models on diverse datasets and improve the accuracy and efficiency of the claim adjudication.

Although FIG. 2 shows exemplary components of the system 200, additional or alternative implementations of the system 200 can include fewer components, different components, differently arranged components, or additional functional components than depicted in FIG. 2. Additionally, or alternatively, one or more components of the system 200 can perform functions described as being performed by one or more other components of the system 200.

Figure 3:
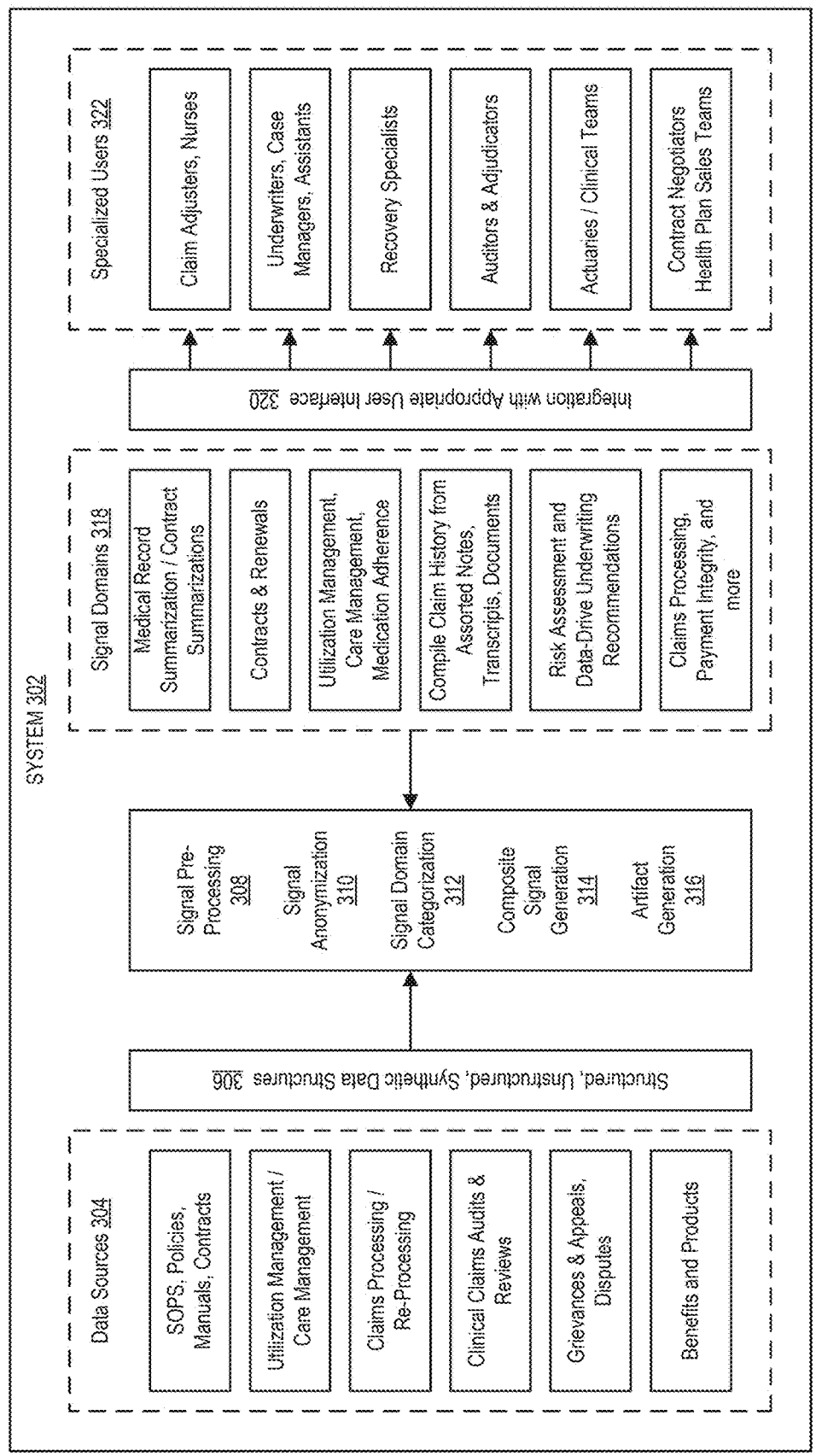
FIG. 3 is a block diagram of an example system architecture that can implement the multi-domain signal evaluation system of FIG. 2, in accordance with some embodiments of the present technology.

FIG. 3 is a block diagram of an example system architecture 300 that can implement the multi-domain signal evaluation system 200 of FIG. 2, in accordance with some embodiments of the present technology. As illustrated in FIG. 3, the system architecture 300 includes a multi-domain signal evaluation system 302 (alternatively referred to as "system 302") that is configured to analyze and/or process signals (e.g., alphanumeric text data) derived from input data sources 304 (e.g., a digital document) according to one or more signal domain groups 318 (e.g., categorical identities and/or data types associated with select signal attributes) to generate enhanced analytical tools (e.g., user interactive guidance artifacts) that enable specialized users 322 to implement and/or cause actions that target specific outcomes with respect to a decision logic condition. In some implementations, the architecture 300 can include one or more computing devices (e.g., servers 110, 120 and/or databases 115, 125 of FIG. 1) configured to perform one or more operations of the system 302 as described herein. In some implementations, the system 302 can refer to the multi-domain signal evaluation system 200 of FIG. 2.

As shown in FIG. 3, the system 302 can be configured to receive and/or process alphanumeric signal data from one or more input data sources 304, such as a digital document and/or a machine-readable object (e.g., a PDF, an Office Open XML, and/or the like). In some implementations, the system 302 can extract and format the input signal data into a specified data structure 306, such as a structured data structure (e.g., a fillable form-based object, a declarative file format, and/or the like), an unstructured data structure (e.g., collection of text characters from an Optical Character Recognition of an image-based document), and/or synthetic data sources (e.g., artificial simulation data). In some implementations, the system 302 can retrieve the input signal data from data sources 304 that correspond to specified signal domains and/or data structure types, including but not limited to SOPs, policies, manuals, and contracts, utilization management/care management, claims processing/claims re-processing, clinical claim audits and reviews, grievance and appeals disputes, and benefits and products. In some implementations, the system 302 can receive input alphanumeric signal data from data sources 304 that pertain to a decision logic condition (e.g., a scenario for an insurance claim) and a corresponding set of available user actions (e.g., a set of claim response and/or handling options).

As illustrated in FIG. 3, the system 302 can analyze the input signal data (e.g., extracted alphanumeric signal data) via a sequence of processing components (e.g., including alternatives to the order presented herein) that comprises a signal pre-processing component 308, a signal anonymization component 310, a signal domain categorization component 312, a composite signal generation component 314, and/or an artifact generation component 316. In some implementations, the system 302 can extract and format the input signal data from the one or more data sources 304 into a standardized, or unstructured, data structure 306 (e.g., a data artifact) at the signal pre-processing component 308.

In some implementations, the system 302 can mask a subset of the input signal data (e.g., or portions of the data artifact) that fail to satisfy with one or more pre-determined, or required, data compliance parameters (e.g., data handling guidelines, prohibited content rules, and/or the like) at the signal anonymization component 310. For example, the system 302 can compare portions of the input signal data to each individual data compliance parameter to assess a likelihood (e.g., an algorithmic similarity score, a machine learning model predicted label, and/or the like) that the specified portion of the input signal data satisfies the individual data compliance parameter. Accordingly, the system 302 can evaluate if the assessed likelihoods satisfy an evaluation threshold to determine whether the input signal data (e.g., or portions thereof) satisfies the specified compliance parameters. In response to identifying portions of the input signal data that fail to satisfy the compliance parameters, the system 302 can generate, or retrieve, a content equivalent masking element used to substitute and/or replace the non-compliant portions of the input signal data. For example, the system 302 can retrieve (e.g., from a stored database) a pre-determined alphanumeric signal of equivalent content (e.g., similar contextual parameters and/or transient signal properties) to an identified non-compliant portion of the input signal data. Accordingly, the system 302 can modify the input signal data to replace the non-compliant signal data with the pre-determined alphanumeric signals. In some implementations, the system 302 can store a mapping (e.g., a symbolic link, a lookup table, and/or the like) between the non-compliant alphanumeric signals and the corresponding masking elements.

In some implementations, the system 302 can assign portions of the modified input signal data (e.g., or alternatively unmodified input signal data) to one or more pre-determined signal domains 318 and/or categories at the signal domain categorization component 312. For example, the pre-determined signal domains 318 can include, but not limited to, medical record summarizations/contract summarizations, contracts and renewals, utilization management, care management, medical adherence, compiled claim history from assorted notes, transcripts, documents, prediction, risk assessment and data-driven underwriting recommendations, and claim processing payment integrity. The system 302 can compare portions of the input signal data to pre-determined signal attributes of each signal domain 318 to assess a similarity score (e.g., a machine learning label, an algorithmic regression, and/or the like) that indicates relevance of the specified portion of input signal data to the signal domain 318 category. Accordingly, the system 302 can evaluate the assessed similarity score satisfy a similarity threshold to determine whether the input signal data (e.g., or portions thereof) corresponds to a specified signal domain 318. In response to a positive indication (e.g., sufficient similarity of signal properties) for a specified signal domain 318, the system 302 can assign a designated label (e.g., a categorical identifier, a reference tag, and/or the like) to the corresponding portions of the input signal data. As an illustrative example, the system can assign a label indicating signal properties relating to medical information (e.g., a patient medication history, an appointment record, and/or the like) to specified portions of the input signal data that satisfy the corresponding similarity threshold (e.g., a description of pharmaceuticals used within a specified time frame). In the example, the system can similarly assign a separate label indicating signal properties relating to legal liabilities (e.g., a binding contract, a subscription plan, and/or the like) to specified portions of the input signal data that satisfy the corresponding similarity threshold (e.g., a description of an established legal contract between individuals). Accordingly, the system 302 can generate and/or assign a set of designated labels that correspond to different portions of the input signal data. In some implementations, the system 302 can use a stored data structure that maps available signal domain 318 categories to corresponding signal properties and/or thresholds (e.g., a pre-defined label ontology). In some implementations, the system 302 can link each assigned signal domain 318 label to the corresponding portions of the input signal data (e.g., component signal data that satisfy the similarity threshold).

In some implementations, the system 302 can generate composite alphanumeric signals at the composite signal generation component 314. For example, the system 302 can use the modified input signal data (e.g., or alternatively an unmodified input signal data) to generate a composite alphanumeric signal that represents, or indicates, one or more reductive properties of the original input signal data. For example, the system 302 can analyze the contents of the extracted text data from a digital document to generate a narrative summary of the original text contents. In some implementations, the system can use, or cause, a machine learning model (e.g., a generative machine learning model, a large language model, and/or the like) to generate the composite alphanumeric signal based on the modified, or unmodified, input signal data. In some implementations, the system 302 can use the assigned set of signal domain 318 labels (e.g., from the signal domain categorization component 312) as contextual parameters for generating the composite alphanumeric signal. For example, the system 302 can input the assigned signal domain 318 labels as an auxiliary input to a machine learning model (e.g., a large language model) to generate a narrative summary of the original, or modified, input text data. In another example, the system 302 can input the actual text data corresponding to the assigned signal domain 318 labels as the auxiliary input to the machine learning model to generate the narrative summary.

In some implementations, the system 302 the system 302 can generate an interactive guidance artifact for end-users at the artifact generation component 316. For example, the system 302 generate, and transmit, a user interfacing element (e.g., a graphical user interface) that is configured to display analytical information for a decision logic condition corresponding to the input signal data, such as a human-readable narrative that recommends invocation of one or more available user actions and/or an approximated outcome (e.g., likelihood of success, consumer satisfaction, financial risks, long-term operational viability, and/or the like) of invoking each recommended action. In some implementations, the system 302 can configure the generated guidance artifact to operate dynamically in response to user activity and/or interactions. For example, the system 302 can configure the user interfacing element to display an alternative, or modified, format (e.g., a simplified bullet list, a shortened narrative paragraph, and/or the like) for the analytical information of the decision logic condition in response to detected user activity (e.g., user selection of a simplified view format). In some implementations, the system 302 can cause a machine learning model (e.g., a large language model) to use the composite alphanumeric signal, the input signal data, and/or additional context parameters to generate the analytical information of the guidance artifact.

In some implementations, the system 302 can customize the display format and/or additional operational features of the interactive guidance artifact in accordance with specialized preferences and/or identity of the end-user 322 (alternatively referred to as "specialized users 322"). As an illustrative example, the system 302 can configure the guidance artifact to augment display of the analytical information (e.g., highlighting select portions) related to medical information in response to identifying the target end-user 322 as a medical practitioner. In some implementations, specialized users 322 can include, but not limited to, claim adjusters, nurses, underwriters, case managers, assistants, recovery specialists, auditors and adjudicators, actuaries/clinical teams, and contract negotiators health plan sales team.

In some implementations, the system 302 can display (e.g., at a user interface) an interfacing element (e.g., an embedded text-based chat system, a recommended set of selectable queries, and/or the like) that enables end-users to query, in real-time, information (e.g., additional analytical information, sourced portions of original input signal data, and/or the like) associated with the decision logic condition and/or input data source. Accordingly, the system 302 can configure the interfacing element to respond, in real-time, to the received user queries via additional user interfacing elements (e.g., separate display artifacts and/or modification of displayed guidance artifact). For example, the system 302 can respond to a user query for additional information by generating, and displaying, in real-time a human-readable narrative that lists portions of the input signal data (e.g., or adjusted versions thereof) that correspond to pharmaceutical information. In some implementations, the system 302 can display one or more mappings between portions of the real-time generated user query response and sourced portions of the input signal data. In some implementations, the system 302 can cause a machine learning model (e.g., a large language model) to use a combination of the real-time user query, the input signal data, the composite alphanumeric signal, and/or additional context parameters to generate the real-time query response.

In some implementations, the system 302 can use hardware acceleration tools and/or methods (e.g., graphical processing units) to expedite one or more processing functions as described herein.

Figure 4:
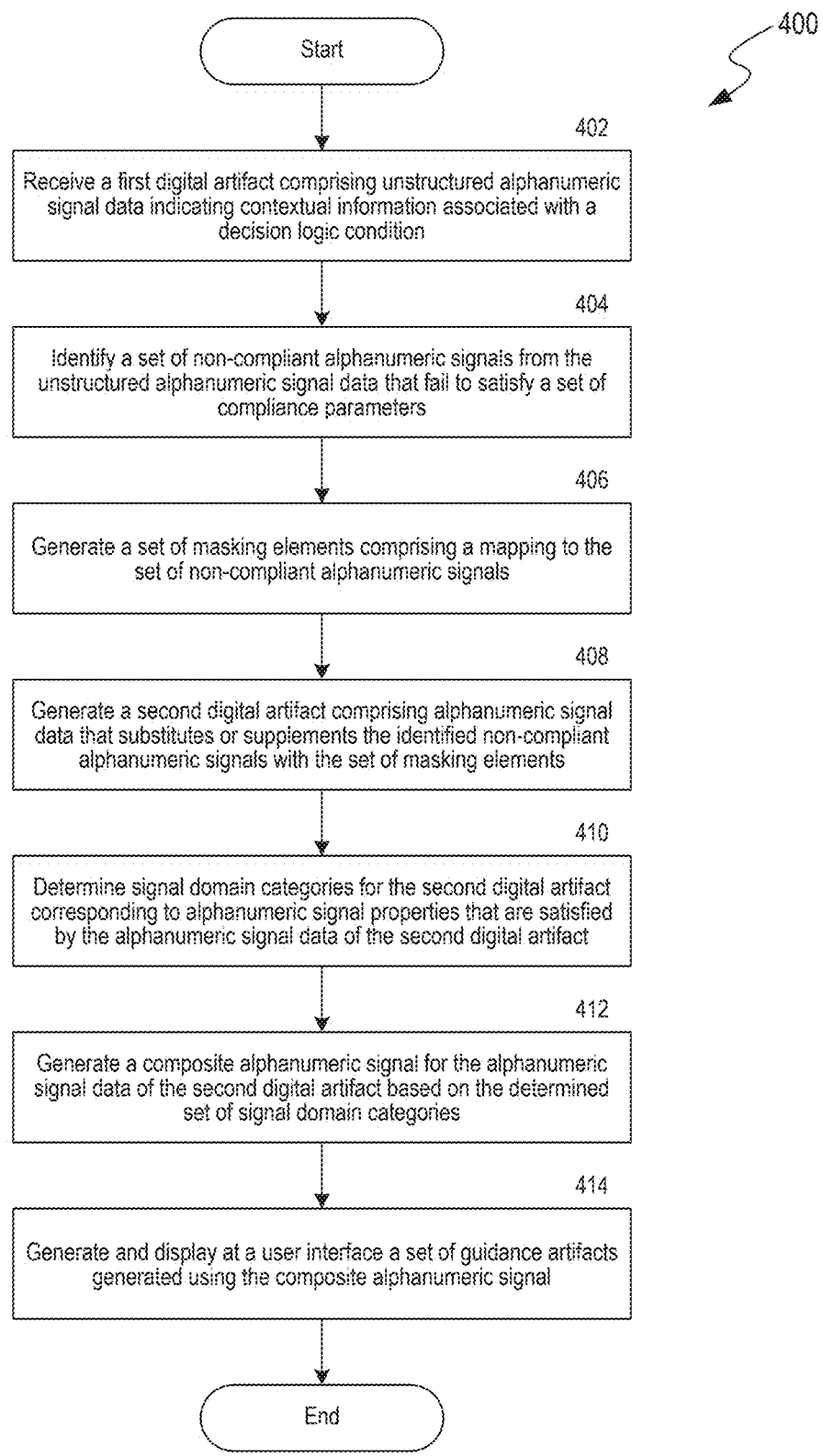
FIG. 4 is a flow diagram that illustrates an example process for evaluating multi-domain signals in some implementations of the present technology.

Example Signal Evaluation Operations of the
Multi-Domain Signal Evaluation System FIG. 4 is a flow diagram that illustrates an example process for evaluating multi-domain signals in some implementations of the present technology. The process 400 can be performed by a system (e.g., multi-domain signal evaluation system 200) configured to determine signal domain categories (e.g., predetermined signal properties) for unstructured alphanumeric signal data of digital artifacts according to one or more signal processing criteria. In one example, the system includes at least one hardware processor and at least one non-transitory memory storing instructions, which, when executed by the at least one hardware processor, cause the system to perform the process 400. In another example, the system includes a non-transitory, computer-readable storage medium comprising instructions recorded thereon, which, when executed by at least one data processor, cause the system to perform the process 400.

At 402, the system can receive a digital artifact (e.g., from a remote database) comprising unstructured alphanumeric signal data (e.g., string text, special characters, symbolic character sets, linguistic alphabets, and/or the like) indicating contextual information associated with a decision logic condition. For example, the system can retrieve a digital document (e.g., a PDF, a text file, and/or the like) comprising narrative and/or descriptive texts that describe an insurance claim scenario along with relevant conditional factors (e.g., a policy number, a client profile information, a recorded event, an authorized report, and/or the like). In some implementations, the system can access (e.g., from a remote database) a mapping between sets of eligibility criterions (e.g., a policy ruleset) and predetermined results for the decision logic condition. For example, the system can retrieve one or more predetermined thresholds (e.g. a binary condition, an acceptable number range, and/or the like) that, when satisfied by the analyzed contents (e.g., alphanumeric signal data) of the digital artifact, maps to a specified status (e.g., a claim approval) for the decision logic condition.

In some implementations, the system can receive structured alphanumeric signal data (e.g., JSON, YAML, and/or the like) comprising an internal mapping between narrative and/or descriptive texts describing the insurance claim scenario to predefined keywords and/or conditional parameters. In some implementations, the system can receive a corresponding set of compliance parameters for the digital artifact that defines acceptable content elements for the unstructured alphanumeric signal data, such as identifiable user information (e.g., an official name, a phone number, an address, an email, a demographic information, and/or the like), a prohibited and/or protected content types (e.g., HIPAA affiliated information), a user specified content restriction, a data usage restriction, a third-party regulatory restriction, and/or any combination thereof. In some implementations, the system can assign, or receive assignment (e.g., from a user selection via a client user interface), of a predetermined set of compliance parameters for the digital artifact, or a digital artifact type (e.g., a classification and/or category of insurance claim information).

At 404, the system can identify a set of non-compliant alphanumeric signals (e.g., invalid and/or restricted data) from the unstructured alphanumeric signal data that fail to satisfy the set of compliance parameters. For example, the system can access a predefined non-compliant signal schema (e.g., a synthetic template, a negative sample, and/or the like) that comprises alphanumeric signal attributes (e.g., detected keywords, information types, content sensitivity, data specificity, and/or the like) that fail to satisfy at least one compliance parameter (e.g., or at least a subset of multiple compliance parameters) from the set of compliance parameters. By comparing the non-compliant signal schema to contents of the unstructured alphanumeric signal data, the system can identify anomalous component alphanumeric signals that fail one or more corresponding compliance parameters. For example, the system can analyze the natural language contents (e.g., phrases, sentences, and/or the like) of the unstructured alphanumeric signal data to identify one or more critical features (e.g., keywords, groups of words, and/or the like) that are present in the non-compliant signals schema. In some implementations, the system can cause a generative machine learning model to identify and/or generate a component alphanumeric signal (e.g., a substring, an intermediary index, and/or the like) from the unstructured alphanumeric signal data that corresponds to the non-compliant alphanumeric signal attributes of the predefined non-compliant signal schema.

At 406, the system can generate a set of masking elements (e.g., text substitutions) comprising a mapping to the identified set of non-compliant alphanumeric signals. For example, the system can select at least one predefined masking element for substituting an identified non-compliant alphanumeric signal (e.g., of the unstructured alphanumeric signal data) such that the masking element satisfies the set of compliance parameters for the digital artifact. In some implementations, the predefined masking element can include a generic and/or unidentifiable signal that provides an obscured proxy (e.g., an abstract construct and/or representation) of the non-compliant alphanumeric signal. For example, the system can determine a generic masking label "CLIENT" to operate as an obscured proxy signal for alphanumeric signal data (e.g., of the digital artifact) that corresponds to a proper legal name. In another example, the system can determine a generic masking label "INCIDENT LOCATION" to operate as an obscured proxy signal for alphanumeric signal data (e.g., of the digital artifact) that corresponds to a specific geolocation associated with a claim scenario. In other implementations, the system can determine a censorship label (e.g., a repeated series of undistinguishable characters) that hides the identified non-compliant alphanumeric signal data. In some implementations, the system can directly access predefined masking elements that are stored in the predefined non-compliant signal schema. In other implementations, the system can generate a stored mapping (e.g., a symbolic link) between at least one identified masking element and the identified non-compliant component alphanumeric signal of the digital artifact.

At 408, the system can generate a second digital artifact (e.g., or a modified version of the initial digital artifact) comprising alphanumeric signal data that substitutes and/or supplements the identified non-compliant alphanumeric signals of the unstructured alphanumeric signal data with the set of masking elements. For example, the system can generate a second digital artifact that comprises a copy of the alphanumeric signal contents of the initial, or first, received digital artifact. Further, the system can substitute portions of the copied alphanumeric signal contents corresponding to the identified non-compliant alphanumeric signals with a mapped masking element from the set of masking elements. As a result, the system can perform additional signal processing functions, as described herein, using the compliant alphanumeric signal data of the second digital artifact while maintaining overall content validity of the first digital artifact.

At 410, the system can determine a set of signal domain categories (e.g., signal types, attribute groups, representative labels, tags, and/or the like) for the alphanumeric signal data of the second digital artifact. In some implementations, the system can assign one or more signal domain categories to the second digital artifact such that each signal domain category corresponds to qualifying alphanumeric signal properties (e.g., characteristic text and/or narrative attributes) that are satisfied by the alphanumeric signal data of the second digital artifact. As an illustrative example, the system can access (e.g., from a remote database) one or more representative signal properties (e.g., a chemical formula, a hospital name, a technical treatment procedure, and/or the like) that correspond to signal domain categories (e.g., signal labels and/or tags) indicating critical pharmaceutical information (e.g., prescribed medications for a client post-incident). In response to determining and/or identifying one or more component alphanumeric signals from the digital artifact that satisfy the one or more representative signal properties, the system can assign the corresponding data category to the digital artifact. In some implementations, the system can apply a statistical inference algorithm (e.g., a cosine similarity, a Euclidean distance, a machine learning model, and/or the like) to identify component alphanumeric signals of the digital artifact that shares similar signal attributes (e.g., satisfies a similarity threshold) with the one or more representative signal properties. In some implementations, the system can cause a generative machine learning model (e.g., a large language model) to identify the one or more component alphanumeric signals (e.g., text fragments, individual sentences, and/or the like) of the second digital artifact that satisfy the one or more predetermined alphanumeric signal properties of the at least one signal domain category.

In some implementations, the system can determine the set of signal domain categories for the alphanumeric signal data of the second digital artifact based on a predetermined classification hierarchy structure. For example, the system can access (e.g., from a remote database) a multi-domain signal classification schema that maps individual signal domain categories to one or more predetermined alphanumeric signal properties. Using the multi-domain signal classification schema, the system can assign at least one signal domain category to the second digital artifact such that the one or more predetermined alphanumeric signal properties of the at least one signal domain category is satisfied by an identified subset of alphanumeric signals (e.g., substring text, enclosed index coordinates, and/or the like) from the second digital artifact.

In some implementations, the multi-domain signal classification schema can include multiple classification levels that groups multiple signal domain categories into combined signal domain categories (e.g., parent signal domain categories). As an illustrative example, the system can access a schema that includes a first signal domain category (e.g., post-incident medical information) and a second signal domain category (e.g., pre-incident medical information) such that both the first and the second signal domain categories are related via a common signal domain category (e.g., incident medical information). Accordingly, the system can assign the common signal domain category to a digital artifact to indicate assignment of the first and the second signal domain categories. In additional or alternative implementations, the system can use the multiple classification levels of the multi-domain signal classification schema to represent different and/or specific sets of predetermined alphanumeric signal properties that are satisfied by the digital artifact. For example, the multi-domain signal classification schema can map the first signal domain category, second signal domain category, and common signal domain category to a first, second, and third set of alphanumeric signal properties, respectively, such that the third set of alphanumeric signal properties is a subset of both the first and second set of alphanumeric signal properties (e.g., indicating the first and second signal domain categories require presence of additional signal attributes and/or properties). In an example, the system can assign the first and common, but not second, signal domain category to the digital artifact to indicate that the alphanumeric signal data of the digital artifact satisfies the required signal attributes of the common signal domain category and the additional signal attributes of the first signal domain category but fails to satisfy the signal attributes of the second domain category.

In some implementations, the system can cause a generative machine learning model (e.g., a large language model) to identify the subset of alphanumeric signals of the second digital artifact that satisfies the one or more predetermined alphanumeric signal properties of the at least one signal domain category.

At 412, the system can generate a composite alphanumeric signal for the alphanumeric signal data (e.g., masked text data and/or information) of the second digital artifact based on the determined set of signal domain categories (e.g., attribute groups and/or signal types). For example, the system can create a summarized narrative (e.g., a string text object) that condenses the content information indicated by the alphanumeric signal data of the second digital artifact into a short and/or organized format (e.g., a bullet point list, a categorized summary, and/or the like). In some implementations, the system can generate the composite alphanumeric signal based on a selective combination of alphanumeric signal data from the second digital artifact. For example, the system can extract one or more subsets of alphanumeric signal data (e.g., substring text data, metadata information, and/or the like) from the digital artifact that correspond (e.g., or mapped) to one or more assigned signal domain categories (e.g., data type labels). Accordingly, the system can generate an individual composite alphanumeric signal (e.g., a local and/or categorical summary) for each signal domain category based on the corresponding extracted subset of alphanumeric signal data. Further, the system can evaluate the combination of the individual composite alphanumeric signals (e.g., categorical summaries) to determine a composite alphanumeric signal (e.g., an overview summary) for the second digital artifact. In some implementations, the system can cause a machine learning model (e.g., a neural network, a large language model, and/or the like) to generate the composite alphanumeric signal based on the identified subset of alphanumeric signals of the second digital artifact for the assigned at least one signal domain category.

At 414, the system can use the composite alphanumeric signal to generate and/or display a set of guidance artifacts at a user interface. For example, the system can generate an interactive digital artifact (e.g., a webpage, a user interface element, and/or the like) that comprises and/or displays a human-readable narrative (e.g., a formatted and/or unformatted text paragraph) that recommends invocation of at least on available user action (e.g., claim approval and/or denial) with respect to the decision logic condition (e.g., claim scenario). In some implementations, the system can configure the interactive digital artifact to display the composite alphanumeric signal data (e.g., summarized narrative) associated with the initial digital artifact. In some implementations, the system can configure the interactive digital artifact to display one or more predicted outcomes of executing the recommended invocation of the at least one available user action, which can include, but is not limited to, a financial expense, a consumer satisfaction level, a regulatory compliance, a risk assessment, and/or the like.

In some implementations, the system can generate one or more responses to real-time user queries with respect to the displayed guidance artifacts. For example, the system can display a user interface element (e.g., a chat box) that enables end users to submit one or more queries (e.g., text-based questions) for information associated with the decision logic condition, the initial (e.g., or second) digital artifact, and/or the displayed guidance artifacts. In response to monitoring (e.g., via a background listening program) and/or receiving (e.g., via an Application Programming Interface (API)) a real-time user query for information associated with the decision logic condition, the system can cause a generative machine learning model (e.g., a large language model) to create a human-readable narrative response (e.g., a text-based paragraph) to the user query based on the composite alphanumeric signal (e.g., summarized narrative) and the determined set of signal domain categories (e.g., assigned data types). Accordingly, the system can display the generated human-readable narrative response at the user interface.

In some implementations, the system can generate one or more cost analysis reports (e.g., a financial expense record, a risk assessment profile, and/or the like) for one or more displayed guidance artifacts. For example, the system can display a user interface element (e.g., a button) that enables end users to request a detailed view of outcomes associated with one or more available user actions. In response to detecting a selection of at least one user action, or displayed guidance artifact, the system can access a set of historical records (e.g., a prior expenditure record) that each indicate an outcome result (e.g., resource costs) associated with invocation of the at least one user action. Based on the historical records, the system can generate and/or display an approximate cost analysis report for the select user action, or the guidance artifact, at an expanded view element corresponding to the at least one displayed guidance artifact.

As described above, the system can be configured to cause a generative machine learning model (e.g., a large language model) to generate one or more specified results based on an input dataset in accordance with some implementations of the present invention. In some implementations, the system can generate and/or apply one or more metadata parameters for contextualizing the input dataset of the machine learning model, which biases the model to produce a desired output at inference. For example, the system can generate a custom alphanumeric signal (e.g., a text-based prompt) that comprises one or more guiding instructions on a desired format (e.g., a word count, a bulleted list, and/or the like) for the composite alphanumeric signal (e.g., summarized narrative). Accordingly, the system can cause the machine learning model to use both the input dataset (e.g., signal domain categories) and the contextual metadata parameters (e.g., guiding instructions) to generate the composite alphanumeric signal that satisfies the desired output format.

Example Artificial Intelligence Systems

Figure 5:
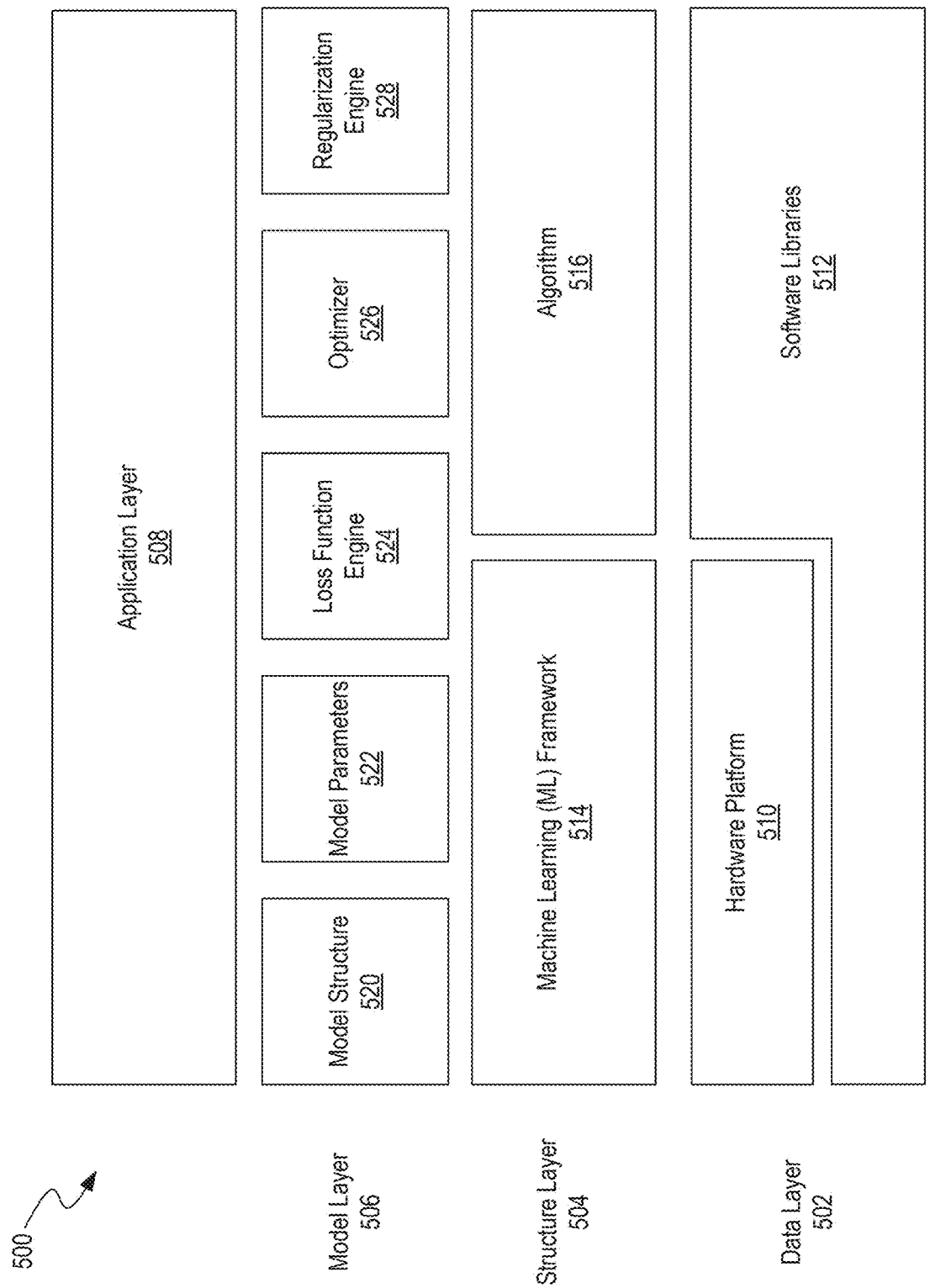
FIG. 5 illustrates a layered architecture of an artificial intelligence (AI) system that can implement the ML models of the multi-domain signal evaluation system of FIG. 2, in accordance with some implementations of the present technology.

FIG. 5 illustrates a layered architecture of an artificial intelligence (AI) system 500 that can implement the ML models of the multi-domain signal evaluation system 200 of FIG. 2, in accordance with some implementations of the present technology. Accordingly, the machine learning models can include one or more components of the AI system 500.

As shown, the AI system 500 can include a set of layers, which conceptually organize elements within an example network topology for the AI system's architecture to implement a particular AI model. Generally, an AI model is a computer-executable program implemented by the AI system 500 that analyses data to make predictions. Information can pass through each layer of the AI system 500 to generate outputs for the AI model. The layers can include a data layer 502, a structure layer 504, a model layer 506, and an application layer 508. The algorithm 516 of the structure layer 504 and the model structure 520 and model parameters 522 of the model layer 506 together form an example AI model. The optimizer 526, loss function engine 524, and regularization engine 528 work to refine and optimize the AI model, and the data layer 502 provides resources and support for application of the AI model by the application layer 508.

The data layer 502 acts as the foundation of the AI system 500 by preparing data for the AI model. As shown, the data layer 502 can include two sub-layers: a hardware platform 510 and one or more software libraries 512. The hardware platform 510 can be designed to perform operations for the AI model and include computing resources for storage, memory, logic and networking. The hardware platform 510 can process amounts of data using one or more servers. The servers can perform backend operations such as matrix calculations, parallel calculations, machine learning (ML) training, and the like. Examples of servers used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC). GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider. The hardware platform 510 can also include computer memory for storing data about the AI model, application of the AI model, and training data for the AI model. The computer memory can be a form of random-access memory (RAM), such as dynamic RAM, static RAM, and non-volatile RAM.

The software libraries 512 can be thought of suites of data and programming code, including executables, used to control the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI system 500 include INTEL Math Kernel Library, NVIDIA cuDNN, EIGEN, and OpenBLAS.

The structure layer 504 can include an ML framework 514 and an algorithm 516. The ML framework 514 can be thought of as an interface, library, or tool that allows users to build and deploy the AI model. The ML framework 514 can include an open-source library, an application programming interface (API), a gradient-boosting library, an ensemble method, and/or a deep learning toolkit that work with the layers of the AI system facilitate development of the AI model. For example, the ML framework 514 can distribute processes for application or training of the AI model across multiple resources in the hardware platform 510. The ML framework 514 can also include a set of pre-built components that have the functionality to implement and train the AI model and allow users to use pre-built functions and classes to construct and train the AI model. Thus, the ML framework 514 can be used to facilitate data engineering, development, hyperparameter tuning, testing, and training for the AI model. Examples of ML frameworks 514 that can be used in the AI system 500 include TENSORFLOW, PYTORCH, SCIKIT-LEARN, KERAS, LightGBM, RANDOM FOREST, and AMAZON WEB SERVICES.

The algorithm 516 can be an organized set of computer-executable operations used to generate output data from a set of input data and can be described using pseudocode. The algorithm 516 can include complex code that allows the computing resources to learn from new input data and create new/modified outputs based on what was learned. In some implementations, the algorithm 516 can build the AI model through being trained while running computing resources of the hardware platform 510. This training allows the algorithm 516 to make predictions or decisions without being explicitly programmed to do so. Once trained, the algorithm 516 can run at the computing resources as part of the AI model to make predictions or decisions, improve computing resource performance, or perform tasks. The algorithm 516 can be trained using supervised learning, unsupervised learning, semi-supervised learning, and/or reinforcement learning.

Using supervised learning, the algorithm 516 can be trained to learn patterns (e.g., map input data to output data) based on labeled training data. The training data can be labeled by an external user or operator. For instance, a user can collect a set of training data, such as by capturing data from sensors, images from a camera, outputs from a model, and the like. Furthermore, training data can include pre-processed data generated by various engines of the signal processing system 200 described in relation to FIG. 2. The user can label the training data based on one or more classes and trains the AI model by inputting the training data to the algorithm 516. The algorithm determines how to label the new data based on the labeled training data. The user can facilitate collection, labeling, and/or input via the ML framework 514. In some instances, the user can convert the training data to a set of feature vectors for input to the algorithm 516. Once trained, the user can test the algorithm 516 on new data to determine if the algorithm 516 is predicting accurate labels for the new data. For example, the user can use cross-validation methods to test the accuracy of the algorithm 516 and retrain the algorithm 516 on new training data if the results of the cross-validation are below an accuracy threshold.

Supervised learning can involve classification and/or regression. Classification techniques involve teaching the algorithm 516 to identify a category of new observations based on training data and are used when input data for the algorithm 516 is discrete. Said differently, when learning through classification techniques, the algorithm 516 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 516 can be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 can be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that can be used by the algorithm 516 include factor analysis, item response theory, latent profile analysis, and latent class analysis.

The model layer 506 implements the AI model using data from the data layer and the algorithm 516 and ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model of the AI system 500. The model structure 520 defines the complexity of the pattern/relationship that the AI model expresses. Examples of structures that can be used as the model structure 520 include decision trees, support vector machines, regression analyses, Bayesian networks, Gaussian processes, genetic algorithms, and artificial neural networks (or, simply, neural networks). The model structure 520 can include a number of structure layers, a number of nodes (or neurons) at each structure layer, and activation functions of each node. Each node's activation function defines how to node converts data received to data output. The structure layers can include an input layer of nodes that receive input data, an output layer of nodes that produce output data. The model structure 520 can include one or more hidden layers of nodes between the input and output layers. The model structure 520 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model and the actual output of the AI model and is used to guide optimization of the AI model during training to minimize the loss function. The loss function can be presented via the ML framework 514, such that a user can determine whether to retrain or otherwise alter the algorithm 516 if the loss function is over a threshold. In some instances, the algorithm 516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 526 used can be determined based on the type of model structure 520 and the size of data and the computing resources available in the data layer 502.

The regularization engine 528 executes regularization operations. Regularization is a technique that prevents over- and under-fitting of the AI model. Overfitting occurs when the algorithm 516 is overly complex and too adapted to the training data, which can result in poor performance of the AI model. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constrain the resulting AI model and improves its ability for generalized application. Examples of regularization techniques include lasso (L1) regularization, ridge (L2) regularization, and elastic (L1 and L2 regularization).

The application layer 508 describes how the AI system 500 is used to solve problem or perform tasks. In an example implementation, the application layer 508 can include the evaluation interface 260 of the multi-domain signal evaluation system 200.

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons can be organized into a neural network layer (or simply "layer") and there can be multiple such layers in a neural network. The output of one layer can be provided as input to a subsequent layer. Thus, input to a neural network can be processed through a succession of layers until an output of the neural network is generated by a final layer. This is a simplistic discussion of neural networks and there can be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" can be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset can be a collection of text documents, referred to as a text corpus (or simply referred to as a corpus). The corpus can represent a language domain (e.g., a single language), a subject domain (e.g., scientific papers), and/or can encompass another domain or domains, be they larger or smaller than a single language or subject domain. For example, a relatively large, multilingual and non-subject-specific corpus can be created by extracting text from online webpages and/or publicly available social media posts. Training data can be annotated with ground truth labels (e.g., each data entry in the training dataset can be paired with a label), or can be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values can be, e.g., the ground truth labels of the training data. If the training data is unlabeled, the desired target value can be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters can be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set can be split into three mutually exclusive subsets: a training set, a validation (or cross-validation) set, and a testing set. The three subsets of data can be used sequentially during ML model training. For example, the training set can be first used to train one or more ML models, each ML model, e.g., having a particular architecture, having a particular training procedure, being describable by a set of model hyperparameters, and/or otherwise being varied from the other of the one or more ML models. The validation (or cross-validation) set can then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (i.e., with the training set) can begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) can begin. The output generated from the testing set can be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training can be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model can be deployed to generate output in real-world applications (also referred to as "inference").

In some examples, a trained ML model can be fine-tuned, meaning that the values of the learned parameters can be adjusted slightly in order for the ML model to better model a specific task. Fine-tuning of an ML model typically involves further training the ML model on a number of data samples (which can be smaller in number/cardinality than those used to train the model initially) that closely target the specific task. For example, an ML model for generating natural language that has been trained generically on publically-available text corpora can be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It can be noted that, while the term "language model" has been commonly used to refer to a ML-based language model, there could exist non-ML language models. In the present disclosure, the term "language model" can be used as shorthand for an ML-based language model (i.e., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model can contain hundreds of thousands of learned parameters or in the case of a large language model (LLM) can contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure can be applicable to any ML-based language model, including language models based on other neural network architectures such as recurrent neural network (RNN)-based language models.

Figure 6:
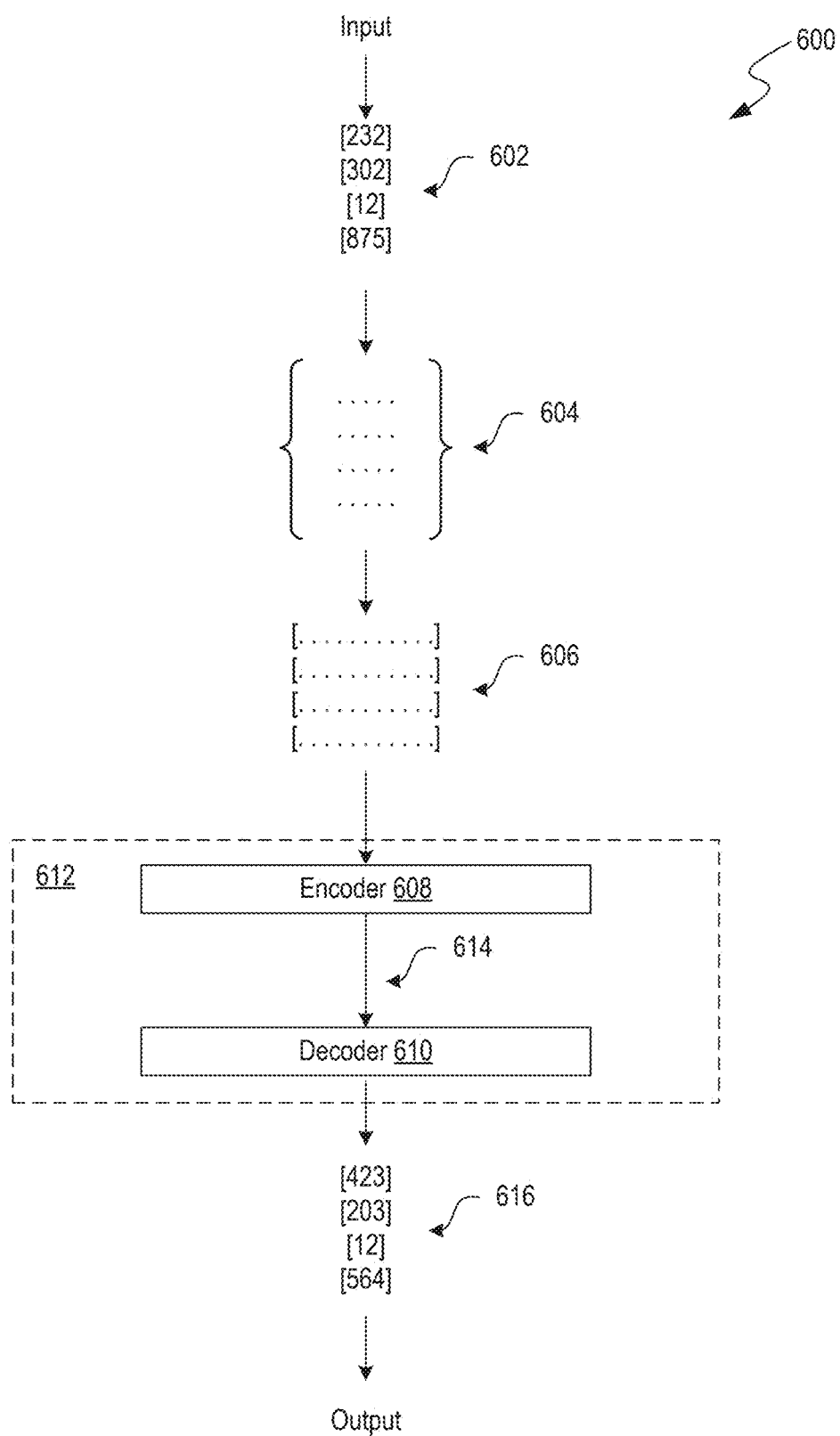
FIG. 6 is a block diagram of an example transformer in accordance with some implementations of the present technology.

FIG. 6 is a block diagram of an example transformer 612 in accordance with some implementations of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure can be applicable to any machine learning (ML)-based language model, including language models based on other neural network architectures such as recurrent neural network (RNN)-based language models.

The transformer 612 includes an encoder 608 (which can comprise one or more encoder layers/blocks connected in series) and a decoder 610 (which can comprise one or more decoder layers/blocks connected in series). Generally, the encoder 608 and the decoder 610 each include a plurality of neural network layers, at least one of which can be a self-attention layer. The parameters of the neural network layers can be referred to as the parameters of the language model.

The transformer 612 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 612 is trained to perform certain functions on other input formats than natural language input. For example, the input can include objects, images, audio content, or video content, or a combination thereof.

The transformer 612 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 6 illustrates an example of how the transformer 612 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], 2, and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 6, a short sequence of tokens 602 corresponding to the input text is illustrated as input to the transformer 612. Tokenization of the text sequence into the tokens 602 can be performed by some pre-processing tokenization module such as, for example, a byte-pair encoding tokenizer (the "pre" referring to the tokenization occurring prior to the processing of the tokenized input by the LLM), which is not shown in FIG. 6 for simplicity. In general, the token sequence that is inputted to the transformer 612 can be of any length up to a maximum length defined based on the dimensions of the transformer 612. Each token 602 in the token sequence is converted into an embedding vector 606 (also referred to simply as an embedding 606). An embedding 606 is a learned numerical representation (such as, for example, a vector) of a token that captures some semantic meaning of the text segment represented by the token 602. The embedding 606 represents the text segment corresponding to the token 602 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 606 corresponding to the "write" token will be closer to another embedding corresponding to the "jot down" token in the vector space as compared to the distance between the embedding 606 corresponding to the "write" token and another embedding corresponding to the "summary" token.

The vector space can be defined by the dimensions and values of the embedding vectors. Various techniques can be used to convert a token 602 to an embedding 606. For example, another trained ML model can be used to convert the token 602 into an embedding 606. In particular, another trained ML model can be used to convert the token 602 into an embedding 606 in a way that encodes additional information into the embedding 606 (e.g., a trained ML model can encode positional information about the position of the token 602 in the text sequence into the embedding 606). In some examples, the numerical value of the token 602 can be used to look up the corresponding embedding in an embedding matrix 604 (which can be learned during training of the transformer 612).

The generated embeddings 606 are input into the encoder 608. The encoder 608 serves to encode the embeddings 606 into feature vectors 614 that represent the latent features of the embeddings 606. The encoder 608 can encode positional information (i.e., information about the sequence of the input) in the feature vectors 614. The feature vectors 614 can have very high dimensionality (e.g., on the order of thousands or tens of thousands), with each element in a feature vector 614 corresponding to a respective feature. The numerical weight of each element in a feature vector 614 represents the importance of the corresponding feature. The space of all possible feature vectors 614 that can be generated by the encoder 608 can be referred to as the latent space or feature space.

Conceptually, the decoder 610 is designed to map the features represented by the feature vectors 614 into meaningful output, which can depend on the task that was assigned to the transformer 612. For example, if the transformer 612 is used for a translation task, the decoder 610 can map the feature vectors 614 into text output in a target language different from the language of the original tokens 602. Generally, in a generative language model, the decoder 610 serves to decode the feature vectors 614 into a sequence of tokens. The decoder 610 can generate output tokens 616 one by one. Each output token 616 can be fed back as input to the decoder 610 in order to generate the next output token 616. By feeding back the generated output and applying self-attention, the decoder 610 is able to generate a sequence of output tokens 616 that has sequential meaning (e.g., the resulting output text sequence is understandable as a sentence and obeys grammatical rules). The decoder 610 can generate output tokens 616 until a special [EOT] token (indicating the end of the text) is generated. The resulting sequence of output tokens 616 can then be converted to a text sequence in post-processing. For example, each output token 616 can be an integer number that corresponds to a vocabulary index. By looking up the text segment using the vocabulary index, the text segment corresponding to each output token 616 can be retrieved, the text segments can be concatenated together, and the final output text sequence can be obtained.

In some examples, the input provided to the transformer 612 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Example Computer System

Figure 7:
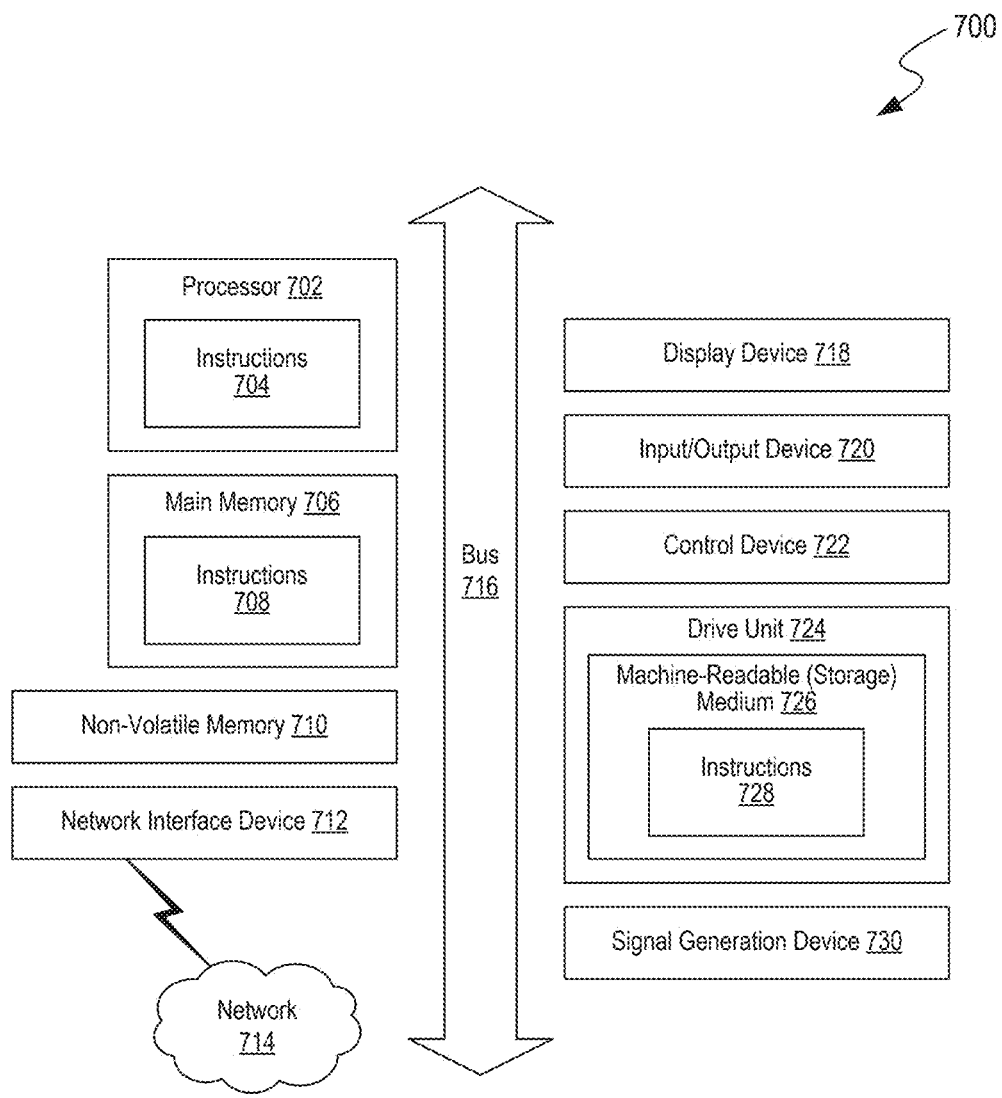
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Further Examples

In some implementations, the techniques described herein relate to a method performed by a multi-domain signal evaluation system for processing alphanumeric signals, the method including receiving a first digital artifact including unstructured alphanumeric signal data indicating contextual information associated with a decision logic condition, wherein the first digital artifact corresponds to a set of compliance parameters that defines acceptable content elements of the unstructured alphanumeric signal data. In some implementations, the method can include generating a set of masking elements including a mapping to the set of non-compliant alphanumeric signals responsive to identifying a set of non-compliant alphanumeric signals from the unstructured alphanumeric signal data that fail to satisfy the set of compliance parameters. In some implementations, the method can include generating a second digital artifact including alphanumeric signal data that substitutes or supplements the identified non-compliant alphanumeric signals of the unstructured alphanumeric signal data with the set of masking elements. In some implementations, the method can include determining a set of signal domain categories for the second digital artifact, each signal domain category corresponding to alphanumeric signal properties that are satisfied by the alphanumeric signal data of the second digital artifact. In some implementations, the method can include generating, using a machine learning model, a composite alphanumeric signal for the alphanumeric signal data of the second digital artifact based on the determined set of signal domain categories. In some implementations, the method can include generating and displaying, at a user interface, a set of guidance artifacts generated using the composite alphanumeric signal, each displayed guidance artifact including (1) a human-readable narrative that recommends invocation of at least one available user action with respect to the decision logic condition, and (2) a predicted outcome of executing the recommended invocation of the at least one available user action.

In some implementations, the method can include causing a generative machine learning model to create a human-readable narrative response to the user query based on the composite alphanumeric signal and the determined set of signal domain categories responsive to a real-time user query for information associated with the decision logic condition. In some implementations, the method can include displaying, at the user interface, the generated human-readable narrative response to the user query in real-time.

In some implementations, the method can include accessing a set of historical expenditure records indicating prior resource costs associated with invocation of the at least one available user action of the at least one displayed guidance artifact responsive to detecting a selection of at least one displayed guidance artifact. In some implementations, the method can include generating an approximate cost analysis report based on the accessed historical expenditure records. In some implementations, the method can include displaying, at the user interface, the generated cost analysis report at an expanded view element corresponding to the at least one displayed guidance artifact.

In some implementations, the method can include accessing, from a remote database, a multi-domain signal classification schema that maps signal domain categories to one or more predetermined alphanumeric signal properties. In some implementations, the method can include assigning at least one signal domain category of the multi-domain signal classification schema to the second digital artifact, wherein the one or more predetermined alphanumeric signal properties of the at least one signal domain category is satisfied by an identified subset of alphanumeric signals from the second digital artifact.

In some implementations, the method can include causing a generative machine learning model to identify the subset of alphanumeric signals of the second digital artifact that satisfies the one or more predetermined alphanumeric signal properties of the at least one signal domain category.

In some implementations, the method can include causing the machine learning model to generate the composite alphanumeric signal based on the identified subset of alphanumeric signals of the second digital artifact for the assigned at least one signal domain category.

In some implementations, the method can include accessing a predefined non-compliant signal schema that includes alphanumeric signal attributes that fail to satisfy at least one compliance parameter from the set of compliance parameters. In some implementations, the method can include causing a generative machine learning model to identify a component alphanumeric signal from the unstructured alphanumeric signal data that corresponds to the alphanumeric signal attributes of the predefined non-compliant signal schema.

In some implementations, the techniques described herein relate to a method, wherein the predefined non-compliant signal schema corresponds to at least one masking element that satisfies the at least one compliance parameter. In some implementations, the method can include generating a stored mapping between the at least one masking element and the identified component alphanumeric signal of the unstructured alphanumeric signal data.

In some implementations, the techniques described herein relate to a method, wherein the set of compliance parameters includes identifiable user information, a prohibited content type, a user specified content restriction, a data usage restriction, a third-party regulatory restriction, or a combination thereof.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense-that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A method performed by a multi-domain signal evaluation system for processing alphanumeric signals, the method comprising:
  receiving a first digital artifact comprising unstructured alphanumeric signal data indicating contextual information associated with a decision logic condition,
    wherein the first digital artifact corresponds to a set of compliance parameters that define one or more acceptable content elements of the unstructured alphanumeric signal data;
  responsive to identifying a set of non-compliant alphanumeric signals from the unstructured alphanumeric signal data that fail to satisfy the set of compliance parameters:
    generating a set of masking elements comprising a mapping to the set of non-compliant alphanumeric signals, and
    generating a second digital artifact comprising alphanumeric signal data that substitutes or supplements the identified non-compliant alphanumeric signals of the unstructured alphanumeric signal data with the set of masking elements;
  determining a set of signal domain categories for the second digital artifact, each signal domain category corresponding to one or more alphanumeric signal properties that are satisfied by the alphanumeric signal data of the second digital artifact;
  using the determined set of signal domain categories, generating, using a machine learning model, a composite alphanumeric signal for the alphanumeric signal data of the second digital artifact; and
  generating and configuring for display, at a user interface, a set of guidance artifacts generated using the composite alphanumeric signal, each displayed guidance artifact comprising:
    (1) a human-readable narrative that recommends invocation of at least one available user action with respect to the decision logic condition, and
    (2) a predicted outcome of executing the recommended invocation of the at least one available user action.

2. The method of claim 1, further comprising:
  responsive to a real-time user query for information associated with the decision logic condition:
    causing a generative machine learning model to create a human-readable narrative response to the user query based on the composite alphanumeric signal and the determined set of signal domain categories, and
    displaying, at the user interface, the generated human-readable narrative response to the user query in real-time.

3. The method of claim 1, further comprising:
  responsive to detecting a selection of at least one displayed guidance artifact:
    accessing a set of historical expenditure records indicating prior resource costs associated with invocation of the at least one available user action of the at least one displayed guidance artifact,
    generating an approximate cost analysis report based on the accessed historical expenditure records, and
    displaying, at the user interface, the generated cost analysis report at an expanded view element corresponding to the at least one displayed guidance artifact.

4. The method of claim 1, wherein determining the set of signal domain categories further comprises:
  accessing, from a remote database, a multi-domain signal classification schema that maps signal domain categories to one or more predetermined alphanumeric signal properties; and
  assigning at least one signal domain category of the multi-domain signal classification schema to the second digital artifact,
    wherein the one or more predetermined alphanumeric signal properties of the at least one signal domain category is satisfied by an identified subset of alphanumeric signals from the second digital artifact.

5. The method of claim 4, further comprising:
  causing a generative machine learning model to identify the subset of alphanumeric signals of the second digital artifact that satisfies the one or more predetermined alphanumeric signal properties of the at least one signal domain category.

6. The method of claim 4, further comprising:
  causing the machine learning model to generate the composite alphanumeric signal based on the identified subset of alphanumeric signals of the second digital artifact for the assigned at least one signal domain category.

7. The method of claim 1, wherein identifying the set of non-compliant alphanumeric signals further comprises:
  accessing a predefined non-compliant signal schema that comprises alphanumeric signal attributes that fail to satisfy at least one compliance parameter from the set of compliance parameters; and
  causing a generative machine learning model to identify a component alphanumeric signal from the unstructured alphanumeric signal data that corresponds to the alphanumeric signal attributes of the predefined non-compliant signal schema.

8. The method of claim 7, wherein the predefined non-compliant signal schema corresponds to at least one masking element that satisfies the at least one compliance parameter, and wherein the method further comprises:
  generating a stored mapping between the at least one masking element and the identified component alphanumeric signal of the unstructured alphanumeric signal data.

9. The method of claim 1, wherein the set of compliance parameters comprises identifiable user information, a prohibited content type, a user specified content restriction, a data usage restriction, a third-party regulatory restriction, or a combination thereof.

10. A non-transitory, computer-readable storage medium comprising instructions recorded thereon, wherein the instructions when executed by at least one data processor of a multi-domain signal evaluation system, cause the system to:
  receive a first digital artifact comprising unstructured alphanumeric signal data indicating contextual information associated with a decision logic condition, wherein the first digital artifact corresponds to a set of compliance parameters that defines acceptable content elements of the unstructured alphanumeric signal data;

responsive to identifying a set of non-compliant alphanumeric signals from the unstructured alphanumeric signal data that fail to satisfy the set of compliance parameters:
  generate a set of masking elements comprising a mapping to the set of non-compliant alphanumeric signals, and
  generate a second digital artifact comprising alphanumeric signal data that substitutes or supplements the identified non-compliant alphanumeric signals of the unstructured alphanumeric signal data with the set of masking elements;

generate, using a machine learning model, a condensed alphanumeric signal based on one or more signal domain categories assigned to the second digital artifact, each assigned signal domain category corresponding to alphanumeric signal properties satisfied by the alphanumeric signal data of the second digital artifact; and generate and display, at a user interface, a set of guidance artifacts generated using the condensed alphanumeric signal, each displayed guidance artifact comprising:
  (1) a human-readable narrative that recommends invocation of at least one available user action with respect to the decision logic condition, and
  (2) a predicted outcome of executing the recommended invocation of the at least one available user action.

11. The non-transitory, computer-readable storage medium of claim 10, wherein the multi-domain signal evaluation system is further caused to:
  responsive to a real-time user query for information associated with the decision logic condition:
    cause a generative machine learning model to create a human-readable narrative response to the user query based on the condensed alphanumeric signal and the one or more assigned signal domain categories, and
    display, at the user interface, the generated human-readable narrative response to the user query in real-time.

12. The non-transitory, computer-readable storage medium of claim 10, wherein the multi-domain signal evaluation system is further caused to:
  responsive to detecting a selection of at least one displayed guidance artifact:
    access a set of historical expenditure records indicating prior resource costs associated with invocation of the at least one available user action of the at least one displayed guidance artifact,
    generate an approximate cost analysis report based on the accessed historical expenditure records, and
    display, at the user interface, the generated cost analysis report at an expanded view element corresponding to the at least one displayed guidance artifact.

13. The non-transitory, computer-readable storage medium of claim 10, wherein determining the set of signal domain categories further causes the multi-domain signal evaluation system to:
  access, from a remote database, a multi-domain signal classification schema that maps signal domain categories to one or more predetermined alphanumeric signal properties; and
  assign at least one signal domain category of the multi-domain signal classification schema to the second digital artifact,
    wherein the one or more predetermined alphanumeric signal properties of the at least one signal domain category is satisfied by an identified subset of alphanumeric signals from the second digital artifact.

14. The non-transitory, computer-readable storage medium of claim 13, wherein the multi-domain signal evaluation system is further caused to:
  cause a generative machine learning model to identify the subset of alphanumeric signals of the second digital artifact that satisfies the one or more predetermined alphanumeric signal properties of the at least one signal domain category.

15. The non-transitory, computer-readable storage medium of claim 10, wherein the set of compliance parameters comprises identifiable user information, a prohibited content type, a user specified content restriction, a data usage restriction, a third-party regulatory restriction, or a combination thereof.

16. A multi-domain signal evaluation system comprising:
  at least one hardware processor; and
  at least one non-transitory memory storing instructions, which, when executed by the at least one hardware processor, cause the multi-domain signal evaluation system to:
    receive a first digital artifact comprising unstructured alphanumeric signal data indicating contextual information associated with a decision logic condition,
      wherein the first digital artifact corresponds to a set of compliance parameters that defines acceptable content elements of the unstructured alphanumeric signal data;
    responsive to identifying a set of non-compliant alphanumeric signals from the unstructured alphanumeric signal data that fail to satisfy the set of compliance parameters:
      generate a set of masking elements comprising a mapping to the set of non-compliant alphanumeric signals, and
      generate a second digital artifact comprising alphanumeric signal data that substitutes or supplements the identified non-compliant alphanumeric signals of the unstructured alphanumeric signal data with the set of masking elements;
    generate, using a machine learning model, a condensed alphanumeric signal based on one or more signal domain categories assigned to the second digital artifact, each assigned signal domain category corresponding to alphanumeric signal properties satisfied by the alphanumeric signal data of the second digital artifact; and
    generate and display, at a user interface, a set of guidance artifacts generated using the condensed alphanumeric signal, each displayed guidance artifact comprising:
      (1) a human-readable narrative that recommends invocation of at least one available user action with respect to the decision logic condition, and
      (2) a predicted outcome of executing the recommended invocation of the at least one available user action.

17. The multi-domain signal evaluation system of claim 16, wherein assigning the one or more signal domain categories further causes the multi-domain signal evaluation system to:

access, from a remote database, a multi-domain signal classification schema that maps signal domain categories to one or more predetermined alphanumeric signal properties; and assign at least one signal domain category of the multi-domain signal classification schema to the second digital artifact,
 wherein the one or more predetermined alphanumeric signal properties of the at least one signal domain category is satisfied by an identified subset of alphanumeric signals from the second digital artifact.

18. The multi-domain signal evaluation system of claim 17 further caused to:

cause the machine learning model to generate the condensed alphanumeric signal based on the identified subset of alphanumeric signals of the second digital artifact for the assigned at least one signal domain category.

19. The multi-domain signal evaluation system of claim 16, wherein identifying the set of non-compliant alphanumeric signals further causes the multi-domain signal evaluation system to:

access a predefined non-compliant signal schema that comprises alphanumeric signal attributes that fail to satisfy at least one compliance parameter from the set of compliance parameters; and cause a generative machine learning model to identify a component alphanumeric signal from the unstructured alphanumeric signal data that corresponds to the alphanumeric signal attributes of the predefined non-compliant signal schema.

20. The multi-domain signal evaluation system of claim 19, wherein the predefined non-compliant signal schema corresponds to at least one masking element that satisfies the at least one compliance parameter, and wherein the multi-domain signal evaluation system is further caused to:

generate a stored mapping between the at least one masking element and the identified component alphanumeric signal of the unstructured alphanumeric signal data.

* * * * *